US010652902B2

(12) United States Patent
Zhang et al.

(10) Patent No.: US 10,652,902 B2
(45) Date of Patent: May 12, 2020

(54) METHOD FOR MEASURING CHANNEL STATE INFORMATION, NETWORK-SIDE DEVICE, AND USER EQUIPMENT

(71) Applicant: Huawei Technologies Co., Ltd., Shenzhen (CN)

(72) Inventors: Lili Zhang, Beijing (CN); Guorong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/090,456

(22) PCT Filed: Mar. 31, 2016

(86) PCT No.: PCT/CN2016/078046
§ 371 (c)(1),
(2) Date: Oct. 1, 2018

(87) PCT Pub. No.: WO2017/166192
PCT Pub. Date: Oct. 5, 2017

(65) Prior Publication Data
US 2019/0116602 A1    Apr. 18, 2019

(51) Int. Cl.
*H04B 7/00* (2006.01)
*H04W 72/08* (2009.01)
(Continued)

(52) U.S. Cl.
CPC ......... *H04W 72/082* (2013.01); *H04L 1/0026* (2013.01); *H04L 5/005* (2013.01);
(Continued)

(58) Field of Classification Search
CPC . H04L 12/26; H04L 12/2858; H04L 12/2859; H04L 25/08
(Continued)

(56) References Cited

U.S. PATENT DOCUMENTS 9,445,296 B2 * 9/2016 Pan ...................... H04L 5/0051
9,673,945 B2 * 6/2017 Geirhofer ............ H04B 7/0626
(Continued)

FOREIGN PATENT DOCUMENTS

CN         1992552 A      7/2007
CN       102792621 A     11/2012
(Continued)

OTHER PUBLICATIONS

Foreign Communication From a Counterpart Application, European Application No. 16895972.4, Extended European Search Report dated Mar. 8, 2019, 10 pages.
(Continued)

*Primary Examiner* — Dmitry Levitan
(74) *Attorney, Agent, or Firm* — Conley Rose, P.C.

(57) ABSTRACT

A method for measuring channel state information (CSI), a network-side device, and a user equipment (UE). The method includes determining, by a network-side device, configuration information, where the configuration information is used to configure UE to perform CSI measurement on different subframe sets on a flexible frequency band or sub-bands of the flexible frequency band, the subframe sets are determined by the network-side device based on uplink-downlink configurations of subframes on the flexible frequency band or the sub-bands of the flexible frequency band in a target cell and at least one neighboring cell of the target cell, and the flexible frequency band is a frequency band on which a transmission direction is configurable, and sending, by the network-side device, the configuration information to the UE to perform the CSI measurement based on the configuration information.

18 Claims, 7 Drawing Sheets

(51) Int. Cl.
*H04L 5/00* (2006.01)
*H04W 24/10* (2009.01)
*H04L 1/00* (2006.01)
*H04W 72/04* (2009.01)
*H04J 11/00* (2006.01)

(52) U.S. Cl.
CPC ........... *H04L 5/0073* (2013.01); *H04W 24/10* (2013.01); *H04W 72/0446* (2013.01); *H04J 11/005* (2013.01); *H04L 5/0057* (2013.01)

(58) Field of Classification Search
USPC .............................. 370/310, 328, 329, 241
See application file for complete search history.

(56) References Cited

U.S. PATENT DOCUMENTS

| | | | | |
|---|---|---|---|---|
| 9,680,581 | B2* | 6/2017 | Song | H04L 5/00 |
| 9,713,026 | B2* | 7/2017 | Gaal | H04W 24/10 |
| 9,788,332 | B2* | 10/2017 | Nagata | H04W 16/02 |
| 9,819,471 | B2* | 11/2017 | Chen | H04L 5/0053 |
| 10,177,972 | B2* | 1/2019 | Li | H04B 7/2656 |
| 2007/0291640 | A1 | 12/2007 | Zhang et al. | |
| 2011/0275394 | A1 | 11/2011 | Song et al. | |
| 2013/0028182 | A1 | 1/2013 | Geirhofer et al. | |
| 2014/0160967 | A1* | 6/2014 | Gao | H04W 24/10 370/252 |
| 2014/0293953 | A1* | 10/2014 | Seo | H04W 24/10 370/329 |
| 2015/0124758 | A1 | 5/2015 | Kim et al. | |
| 2015/0146557 | A1 | 5/2015 | Pan et al. | |
| 2015/0229462 | A1* | 8/2015 | Suzuki | H04L 1/1812 370/280 |
| 2018/0152957 | A1 | 5/2018 | Zhang et al. | |

FOREIGN PATENT DOCUMENTS

| | | |
|---|---|---|
| CN | 103348621 A | 10/2013 |
| CN | 103427938 A | 12/2013 |
| EP | 2938134 A1 | 10/2015 |
| WO | 2015169147 A1 | 11/2015 |

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211, V13.1.0, Mar. 2016, 155 pages.

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331, V13.0.0, Dec. 2015, 507 pages.

"3rd Generation Partnership Project; Technical Specification Group Radio Access Network; Evolved Universal Terrestrial Radio Access (E-UTRA); Physical layer procedures (Release 13)," 3GPP TS 36.213, V13.1.0, Mar. 2016, 361 pages.

Catt, et al. "New study item proposal for Further Enhancements to LTE TDD for DL-UL Interference Management and Traffic Adaptation," 3GPP TSG-RAN Meeting #51, RP-110450, Mar. 15-18, 2010, 6 pages.

Qualcomm Incorporated, "CSI measurement resource restriction for time domain ICIC," 3GPP TSG-RAN WG2 Meeting #72-bis, R2-110661, Jan. 17-21, 2011, 6 pages.

Foreign Communication From a Counterpart Application, PCT Application No. PCT/CN2016/078046, English Translation of International Search Report dated Jan. 5, 2017, 3 pages.

Foreign Communication From a Counterpart Application, PCT Application No. PCT/CN2016/078046, English Translation of Written Opinion dated Jan. 5, 2017, 7 pages.

Machine Translation and Abstract of Chinese Publication No. CN103427938, Dec. 4, 2013, 30 pages.

Foreign Communication from a Counterpart Application, Chinese Application No. 201680083466.X, Chinese Office Action dated Nov. 27, 2019, 10 pages.

* cited by examiner

| Uplink-downlink configuration | Uplink-downlink switching period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

METHOD FOR MEASURING CHANNEL STATE INFORMATION, NETWORK-SIDE DEVICE, AND USER EQUIPMENT

CROSS-REFERENCE TO RELATED APPLICATIONS

This application is a U.S. National Stage of International Patent Application No. PCT/CN2016/078046 filed on Mar. 31, 2016, which is hereby incorporated by reference in its entirety.

TECHNICAL FIELD

Embodiments of the present invention relate to the communications field, and more specifically, to a method for measuring channel state information (Channel Status Information, CSI), a network-side device, and user equipment.

BACKGROUND

There are two duplex modes for mobile communications systems: frequency division duplex (Frequency Division Duplex, FDD) and time division duplex (Time Division Duplex, TDD). In an FDD system, different frequency bands are used for receiving and sending. However, in a TDD system, different times are used for receiving and sending on a same frequency band.

As uplink services and downlink services become more asymmetric in a communications system and a ratio of the uplink services to the downlink services change with time, in a conventional Long Term Evolution (Long Term Evolution, LTE) system, use of fixed paired spectrums in FDD and fixed uplink-downlink timeslot allocation in TDD can no longer effectively support the dynamic asymmetry feature of the services. In addition, because a total volume of uplink and downlink services grows explosively, a half-duplex mode can no longer meet requirements in some scenarios, and a full duplex mode becomes a potential technology. In the flexible full duplex, the growth of the total service volume and the asymmetry feature are fully considered, and uplink resources and downlink resources can be adaptively allocated based on distribution of uplink services and downlink services. In this way, TDD, FDD, and full duplex are organically integrated, and system resource utilization is effectively improved, so that a future network requirement is met.

In a flexible frequency band technology, some uplink frequency bands in an FDD system are configured as "flexible frequency bands". In actual application, based on distribution of uplink services and downlink services in a network, "flexible frequency bands" are allocated for an uplink transmission or a downlink transmission, so that uplink and downlink spectrum resources match uplink and downlink service requirements, and spectrum utilization is improved. As shown in FIG. 1, when a downlink service volume is higher than an uplink service volume in a network, a frequency band f4 originally used for an uplink transmission may be configured as a frequency band used for a downlink transmission in the network. In a flexible duplex technology, TDD may be used on the frequency band f4 to transmit uplink and downlink services. Because there are seven different subframe configuration modes in a TDD mode, when different TDD configurations are used in neighboring cells, cross timeslot interference may occur in the neighboring cells. As shown in FIG. 2, in a timeslot in which a macro cell sends a downlink signal, a femto cell is used to receive an uplink signal. Consequently, a base station to base station interference occurs between the two cells: The downlink signal from a base station in the macro cell is directly received by a base station in the femto cell, and this severely affects quality of an uplink signal received from an L-UE (Local UE, L-UE) by the femto cell.

In an LTE system, when an evolved NodeB (evolved NodeB, eNB) schedules user equipment (User Equipment, UE), in order that the eNB selects an appropriate frequency resource, an appropriate modulation and coding scheme (Modulation and Coding Scheme, MCS), and the like so that the UE can better receive data, the eNB sends a downlink reference signal in all bandwidths of a cell, and then the UE measures CSI of a cell-specific reference signal in all or some bandwidths according to an upper-layer indication and feeds back the CSI to the eNB. The eNB selects an appropriate time frequency resource and an appropriate MCS based on the CSI reported by the UE, and transmits downlink data. In the foregoing technology, the UE reports uniform CSI to all downlink subframes. For example, in a specific CSI reporting period, the UE may select one downlink subframe for CSI measurement and reporting. However, if cross timeslot interference occurs between the neighboring cells, interference between different downlink subframes may be different. For example, in a cell, interference to the cell in one downlink subframe may be downlink interference from a neighboring base station, and interference to the cell in another downlink subframe may be uplink interference from UE served by a neighboring base station. In the foregoing case, if the UE still reports uniform CSI, the base station cannot learn an interference difference between different downlink subframes, and the base station cannot select an appropriate frequency resource, an appropriate MCS, and the like to transmit data. This reduces resource utilization.

SUMMARY

The present invention provides a method for measuring channel state information CSI, a network-side device, and user equipment UE, so that the network-side device can obtain a more accurate CSI measurement result.

In a flexible frequency band technology, some uplink frequency bands in an FDD system are configured as "flexible frequency bands". The frequency bands may all be changed for a downlink transmission, or TDD may be used on these frequency bands to transmit uplink and downlink services.

A first aspect provides a method for measuring channel state information CSI, including: determining, by a network-side device, configuration information, where the configuration information is used to configure user equipment UE to perform CSI measurement on different subframe sets on a flexible frequency band or sub-bands of a flexible frequency band, the subframe sets are determined by the network-side device based on uplink-downlink configurations of subframes on the flexible frequency band or the sub-bands of the flexible frequency band in a target cell and at least one neighboring cell of the target cell, and the flexible frequency band is a frequency band on which a transmission direction is configurable; and sending, by the network-side device, the configuration information to the UE, so that the user equipment performs the CSI measurement based on the configuration information.

According to the method for measuring channel state information in this embodiment of the present invention, the network-side device determines, based on uplink-downlink configurations of subframes in a neighboring cell, different subframe sets on the flexible frequency band or the sub-bands of the flexible frequency band, and configures, based on the configuration information, the UE to perform CSI measurement on the different subframe sets. In this way, compared with the prior art in which UE reports uniform CSI, the network-side device can obtain CSI measurement results corresponding to the different subframe sets. In other words, the network-side device can obtain CSI measurement results that are more accurate, so that the network-side device can select an appropriate time frequency resource and an appropriate MCS based on a corresponding subframe set when scheduling the UE, thereby improving resource utilization and system data transmission performance.

In some implementations, the subframe sets may include a first subframe set and/or a second subframe set.

In some implementations, the first subframe set includes subframes in which transmissions in the target cell are in a downlink direction and transmissions in the at least one neighboring cell are not all in a downlink direction, and the second subframe set includes subframes in which transmissions in the target cell and the at least one neighboring cell are all in a downlink direction.

In some implementations, the subframe sets are determined by the network-side device based on an interference type of mutual interference between the target cell and the at least one neighboring cell.

In some implementations, the network-side device determines an interference level of a subframe of the UE based on the interference type, where the configuration information includes CSI measurement resources and/or subframe sets, and the CSI measurement resources and the subframe sets are corresponding to different interference levels and are determined by the network-side device based on the interference levels of subframes of the UE.

With reference to the first aspect, in a first possible implementation of the first aspect, the method further includes: dividing, by the network-side device, the first subframe set into a plurality of subframe subsets, where each of the plurality of subframe subsets includes subframes in which a same quantity of transmissions are in a downlink direction or in an uplink direction in the at least one neighboring cell. The sending, by the network-side device, the configuration information to the user equipment UE, where the configuration information is used to configure the UE to perform CSI measurement on the first subframe set and/or the second subframe set includes: sending, by the network-side device, the configuration information to the UE, where the configuration information is used to configure the UE to perform CSI measurement on the second subframe set and/or each of the plurality of subframe subsets.

When the subframe sets are further divided, CSI measurement results that are more accurate can be obtained in the CSI measurement performed by the UE. In this way, the network-side device can select a more appropriate time frequency resource and a more appropriate MCS based on a corresponding subframe set or a corresponding subframe subset when scheduling the UE, so that resource utilization and system data transmission performance are further improved.

With reference to the foregoing possible implementation of the first aspect, in a second possible implementation of the first aspect, the configuration information is further used to indicate CSI reference resources configured in the first subframe set and the second subframe set, and/or a subframe configured with the CSI reference resources, and/or a subframe set to which a subframe configured with the CSI reference resources belongs.

With reference to the foregoing possible implementations of the first aspect, in a third possible implementation of the first aspect, the configuration information is further used to indicate CSI reference resources configured in the second subframe set and each of the plurality of subframe subsets, and/or a subframe configured with the CSI reference resources, and/or a subframe set or a subframe subset to which a subframe configured with the CSI reference resources belongs.

With reference to the foregoing possible implementations of the first aspect, in a fourth possible implementation of the first aspect, the CSI reference resources include a cell-specific pilot (Cell Specific Reference Signals, CRS) resource and/or a channel state information reference signal (Channel Status Information Reference Signals, CSI-RS) resource.

With reference to the foregoing possible implementations of the first aspect, in a fifth possible implementation of the first aspect, the CSI reference resources further include a channel state information interference measurement (Channel Status Information Interference Measurement, CSI-IM) resource.

With reference to the foregoing possible implementations of the first aspect, in a sixth possible implementation of the first aspect, the CSI-RS resource is a non-zero power channel state information reference signal (Non Zero Power Channel Status Information Reference Signals, NZP-CSI-RS) and/or a zero power channel state information reference signal CSI-RS.

With reference to the foregoing possible implementations of the first aspect, in a seventh possible implementation of the first aspect, the sending, by the network-side device, the configuration information to the UE includes: sending, by the network-side device, the configuration information to the UE by using broadcast signaling, higher layer signaling, or physical layer L1 signaling.

In some implementations, the network-side device sends the configuration information to the UE by using the higher layer signaling or the physical layer L1 signaling on a first carrier of a plurality of carriers.

With reference to the foregoing possible implementations of the first aspect, in an eighth possible implementation of the first aspect, the sending, by the network-side device, the configuration information to the UE by using broadcast signaling, higher layer signaling, or physical layer L1 signaling includes: when uplink-downlink configurations of subframes are the same on a plurality of carriers in any one of the at least one neighboring cell and uplink-downlink configurations of subframes are the same on a plurality of carriers in the target cell, sending, by the network-side device, the configuration information to the UE by using the higher layer signaling or the physical layer L1 signaling on the first carrier of the plurality of carriers.

The first carrier may be a primary component carrier in the plurality of carriers, or may be a secondary component carrier in the plurality of carriers. In this embodiment of the present invention, the network-side device may send the configuration information to the UE by using the broadcast signaling, the higher layer signaling, or the physical layer L1 signaling only on the first carrier, and does not need to send the configuration information on all the carriers. This can reduce signaling overheads.

With reference to the foregoing possible implementations of the first aspect, in a ninth possible implementation of the first aspect, the method further includes: sending, by the network-side device, CSI reporting trigger information to the UE; and receiving, by the network-side device, CSI sent by the UE and corresponding to a subframe set or a subframe subset that includes and is indicated by a subframe in which the CSI reporting trigger information is located.

CSI can be reported aperiodically by using a subframe set or a subframe subset that is indicated by a subframe in which trigger information is located.

With reference to the foregoing possible implementations of the first aspect, in a tenth possible implementation of the first aspect, the receiving, by the network-side device, CSI sent by the UE and corresponding to a subframe set or a subframe subset that includes and is indicated by a subframe in which the CSI reporting trigger information is located includes: receiving, by the network-side device, CSI sent by the UE and corresponding to a subframe set or a subframe subset that includes and is indicated by a subframe in which first CSI reporting trigger information is located and CSI sent by the UE and corresponding to a subframe set or a subframe subset that includes and is indicated by a subframe in which second CSI reporting trigger information is located, where an absolute value of a difference between the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located is greater than a first preset threshold; or receiving, by the network-side device, CSI corresponding to a subframe set or a subframe subset that includes and is indicated by a subframe in which first CSI reporting trigger information is located, or CSI corresponding to a subframe set or a subframe subset that includes and is indicated by a subframe in which second CSI reporting trigger information is located, where an absolute value of a difference between the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located is less than or equal to a first preset threshold.

Setting a reporting threshold (the first preset threshold) can save resources used for reporting unnecessary CSI, thereby further improving resource utilization.

With reference to the foregoing possible implementations of the first aspect, in an eleventh possible implementation of the first aspect, the method further includes: receiving, by the network-side device, CSI sent by the UE and corresponding to the second subframe set and CSI sent by the UE and corresponding to an $i^{th}$ subframe subset in the plurality of subframe subsets, where an absolute value of a difference between the CSI corresponding to the second subframe set and the CSI corresponding to the $i^{th}$ subframe subset in the plurality of subframe subsets is greater than a second preset threshold, the $i^{th}$ subframe subset includes subframes in which transmissions are in a downlink direction in i cells in the at least one neighboring cell, and i is an integer greater than 0; or receiving, by the network-side device, CSI sent by the UE and corresponding to the second subframe set or CSI sent by the UE and corresponding to an $i^{th}$ subframe subset in the plurality of subframe subsets, where an absolute value of a difference between the CSI corresponding to the second subframe set and the CSI corresponding to the $i^{th}$ subframe subset in the plurality of subframe subsets is less than or equal to a second preset threshold.

Setting a reporting threshold (the second preset threshold) can save resources used for reporting unnecessary CSI, thereby further improving resource utilization.

With reference to the foregoing possible implementations of the first aspect, in a twelfth possible implementation of the first aspect, the method further includes: determining, by the network-side device based on a sequence of quantities of transmissions that are in a downlink direction in the at least one neighboring cell in one subframe of each subframe subset, n subframe subsets in a one-to-one correspondence to the quantities; and receiving, by the network-side device, CSI sent by the UE and corresponding to the second subframe set and CSI sent by the UE and corresponding to a first subframe subset in the n subframe subsets, where an absolute value of a difference between the CSI corresponding to the second subframe set and the CSI corresponding to the first subframe subset in the n subframe subsets is greater than a third preset threshold, and the first subframe subset in the n subframe subsets is corresponding to a largest quantity in the quantities; or receiving, by the network-side device, CSI sent by the UE and corresponding to the second subframe set or CSI sent by the UE and corresponding to a first subframe subset in the n subframe subsets, where an absolute value of a difference between the CSI corresponding to the second subframe set and the CSI corresponding to the first subframe subset in the n subframe subsets is less than or equal to a third preset threshold.

With reference to the foregoing possible implementations of the first aspect, in a thirteenth possible implementation of the first aspect, the method further includes: receiving, by the network-side device, CSI sent by the UE and corresponding to a $j^{th}$ subframe subset in the n subframe subsets and CSI sent by the UE and corresponding to a $(j+1)^{th}$ subframe subset in the n subframe subsets, where an absolute value of a difference between the CSI corresponding to the $j^{th}$ subframe subset in the n subframe subsets and the CSI corresponding to the $(j+1)^{th}$ subframe subset in the n subframe subsets is greater than the third preset threshold, the quantity corresponding to the $j^{th}$ subframe subset in the n subframe subsets is adjacent to the quantity corresponding to the $(j+1)^{th}$ subframe subset in the n subframe subsets, and the quantity corresponding to the $j^{th}$ subframe subset in the n subframe subsets is greater than the quantity corresponding to the $(j+1)^{th}$ subframe subset in the n subframe subsets; or receiving, by the network-side device, CSI sent by the UE and corresponding to a $j^{th}$ subframe subset in the n subframe subsets or CSI sent by the UE and corresponding to a $(j+1)^{th}$ subframe subset in the n subframe subsets, where an absolute value of a difference between the CSI corresponding to the $j^{th}$ subframe subset in the n subframe subsets and the CSI corresponding to the $(j+1)^{th}$ subframe subset in the n subframe subsets is less than or equal to the third preset threshold.

With reference to the foregoing possible implementations of the first aspect, in a fourteenth possible implementation of the first aspect, the method further includes: receiving, by the network-side device, CSI sent by the UE and corresponding to a first subframe subset in the n subframe subsets and CSI sent by the UE and corresponding to a $k^{th}$ subframe subset in the n subframe subsets, where an absolute value of a difference between the CSI corresponding to the first subframe subset in the n subframe subsets and the CSI corresponding to the $k^{th}$ subframe subset in the n subframe subsets is greater than the third preset threshold, and the $k^{th}$ subframe subset in the n subframe subsets is any subframe subset in the n subframe subsets except the first subframe subset in the n subframe subsets; or receiving, by the network-side device, CSI sent by the UE and corresponding to a first subframe subset in the n subframe subsets or CSI sent by the UE and corresponding to a $k^{th}$ subframe subset in the n subframe subsets, where an absolute value of a difference between the CSI corresponding to the first subframe subset in the n subframe subsets and the CSI corresponding to the $k^{th}$ subframe subset in the n subframe subsets is less than or equal to the third preset threshold.

Setting a reporting threshold (the third preset threshold) can save resources used for reporting unnecessary CSI, thereby further improving resource utilization.

With reference to the foregoing possible implementations of the first aspect, in a fifteenth possible implementation of the first aspect, the method further includes: receiving, by the network-side device, a physical uplink shared channel (Physical Uplink Share Channel, PUSCH) sent by the UE, where the PUSCH carries CSI corresponding to the subframe sets.

With reference to the foregoing possible implementations of the first aspect, in a sixteenth possible implementation of the first aspect, the method further includes: receiving, by the network-side device, a physical uplink control channel (Physical Uplink Control Channel, PUCCH) sent by the UE, where the PUCCH carries at least one of the following: CSI corresponding to the subframe sets, acknowledgement (Acknowledgement, ACK)/non-acknowledgement (Non-Acknowledgement, NACK) fed back for the configuration information, and a scheduling request (Scheduling Request, SR).

With reference to the foregoing possible implementations of the first aspect, in a seventeenth possible implementation of the first aspect, the configuration information further includes CSI reporting periods that are configured for the UE by the network-side device and that are corresponding to the second subframe set and the plurality of subframe subsets, where a CSI reporting period corresponding to the second subframe set is T, a CSI reporting period corresponding to the plurality of first subframe subsets is mT, and m is an integer greater than or equal to 2.

With reference to the foregoing possible implementations of the first aspect, in an eighteenth possible implementation of the first aspect, the method further includes: receiving, by the network-side device, group indexes that are sent by the UE, where the group indexes are in a one-to-one correspondence to the subframe sets.

Indicating a corresponding subframe set or a corresponding subframe subset by reporting an index can reduce a resource that needs to be occupied by the UE to report a subframe set or a subframe subset when reporting CSI. This can reduce signaling overheads.

A second aspect provides a method for measuring channel state information CSI, including: receiving, by user equipment UE, configuration information sent by a network-side device, where the configuration information is used to configure the UE to perform CSI measurement on different subframe sets on a flexible frequency band or sub-bands of a flexible frequency band, the subframe sets are determined by the network-side device based on uplink-downlink configurations of subframes on the flexible frequency band or the sub-bands of the flexible frequency band in a target cell and at least one neighboring cell of the target cell, and the flexible frequency band is a frequency band on which a transmission direction is configurable; and performing, by the UE, the CSI measurement based on the configuration information.

According to the method for measuring channel state information in this embodiment of the present invention, the network-side device determines, based on uplink-downlink configurations of subframes in a neighboring cell, different subframe sets on the flexible frequency band or the sub-bands of the flexible frequency band, and configures, based on the configuration information, the UE to perform CSI measurement on the different subframe sets. In this way, compared with the prior art in which UE reports uniform CSI, the network-side device can obtain CSI measurement results corresponding to the different subframe sets. In other words, the network-side device can obtain CSI measurement results that are more accurate, so that the network-side device can select an appropriate time frequency resource and an appropriate MCS based on a corresponding subframe set when scheduling the UE, thereby improving resource utilization and system data transmission performance.

In some implementations, the subframe sets may include a first subframe set and/or a second subframe set; and the performing, by the UE, the CSI measurement based on the configuration information includes: performing, by the UE, the CSI measurement on the first subframe set and/or the second subframe set based on the configuration information.

In some implementations, the first subframe set includes subframes in which transmissions in the target cell are in a downlink direction and transmissions in the at least one neighboring cell are not all in a downlink direction, and the second subframe set includes subframes in which transmissions in the target cell and the at least one neighboring cell are all in a downlink direction.

In some implementations, the subframe sets are determined by the network-side device based on an interference type of mutual interference between the target cell and the at least one neighboring cell.

In some implementations, the network-side device determines an interference level of a subframe of the UE based on the interference type, where the configuration information includes CSI measurement resources and/or subframe sets, and the CSI measurement resources and the subframe sets are corresponding to different interference levels and are determined by the network-side device based on the interference levels of subframes of the UE.

With reference to the second aspect, in a first possible implementation of the second aspect, the performing, by the UE, the CSI measurement on the first subframe set and/or the second subframe set based on the configuration information includes: performing, by the UE, the CSI measurement on the second subframe set and/or all of a plurality of subframe subsets, where the plurality of subframe subsets are obtained by the network-side device by dividing the first subframe set, and each of the plurality of subframe subsets includes subframes in which a same quantity of transmissions are in a downlink direction or in an uplink direction in the at least one neighboring cell.

When the subframe sets are further divided, CSI measurement results that are more accurate can be obtained in the CSI measurement performed by the UE. In this way, the network-side device can select a more appropriate time frequency resource and a more appropriate MCS based on a corresponding subframe set or a corresponding subframe subset when scheduling the UE, so that resource utilization and system data transmission performance are further improved.

With reference to the foregoing possible implementation of the second aspect, in a second possible implementation of the second aspect, the configuration information is further used to indicate CSI reference resources configured in the first subframe set and the second subframe set, and/or a subframe configured with the CSI reference resources, and/or a subframe set to which a subframe configured with the CSI reference resources belongs.

With reference to the foregoing possible implementations of the second aspect, in a third possible implementation of the second aspect, the configuration information is further used to indicate CSI reference resources configured in the second subframe set and each of the plurality of subframe subsets, and/or a subframe configured with the CSI reference resources, and/or a subframe set or a subframe subset to which a subframe configured with the CSI reference resources belongs.

With reference to the foregoing possible implementations of the second aspect, in a fourth possible implementation of the second aspect, the CSI reference resources include a cell-specific pilot CRS resource and/or a channel state information reference signal CSI-RS resource.

With reference to the foregoing possible implementations of the second aspect, in a fifth possible implementation of the second aspect, the CSI reference resources further include a channel state information interference measurement CSI-IM resource.

With reference to the foregoing possible implementations of the second aspect, in a sixth possible implementation of the second aspect, the CSI-RS resource is a non-zero power channel state information reference signal NZP-CSI-RS and/or a zero power channel state information reference signal CSI-RS.

With reference to the foregoing possible implementations of the second aspect, in a seventh possible implementation of the second aspect, the receiving, by user equipment UE, configuration information sent by a network-side device includes: receiving, by the UE, the configuration information sent by the network-side device by using broadcast signaling, higher layer signaling, or physical layer L1 signaling.

In some implementations, the UE may receive the configuration information sent by the network-side device by using the broadcast signaling, the higher layer signaling, or the physical layer L1 signaling on a first carrier of a plurality of carriers.

With reference to the foregoing possible implementations of the second aspect, in an eighth possible implementation of the second aspect, the receiving, by the UE, the configuration information sent by the network-side device by using broadcast signaling, higher layer signaling, or physical layer L1 signaling includes: when uplink-downlink configurations of subframes are the same on a plurality of carriers in any one of the at least one neighboring cell and uplink-downlink configurations of subframes are the same on a plurality of carriers in the target cell, receiving, by the UE, the configuration information sent by the network-side device by using the broadcast signaling, the higher layer signaling, or the physical layer L1 signaling on the first carrier of the plurality of carriers.

The first carrier may be a primary component carrier in the plurality of carriers, or may be a secondary component carrier in the plurality of carriers. In this embodiment of the present invention, the network-side device may send the configuration information to the UE by using the broadcast signaling, the higher layer signaling, or the physical layer L1 signaling only on the first carrier, and does not need to send the configuration information on all the carriers. This can reduce signaling overheads.

With reference to the foregoing possible implementations of the second aspect, in a ninth possible implementation of the second aspect, the method further includes: receiving, by the UE, CSI reporting trigger information sent by the network-side device; and sending, by the UE to the network-side device, CSI corresponding to a subframe set or a subframe subset that includes and is indicated by a subframe in which the CSI reporting trigger information is located.

CSI can be reported aperiodically by using a subframe set or a subframe subset that is indicated by a subframe in which trigger information is located.

With reference to the foregoing possible implementations of the second aspect, in a tenth possible implementation of the second aspect, the receiving, by the UE, CSI reporting trigger information sent by the network-side device includes: receiving, by the UE, first CSI reporting trigger information and second CSI reporting trigger information that are sent by the network-side device; and the sending, by the UE to the network-side device, CSI corresponding to a subframe set or a subframe subset that includes and is indicated by a subframe in which the CSI reporting trigger information is located includes: when an absolute value of a difference between CSI corresponding to a subframe set or a subframe subset that includes and is indicated by a subframe in which the first CSI reporting trigger information is located and CSI corresponding to a subframe set or a subframe subset that includes and is indicated by a subframe in which the second CSI reporting trigger information is located is greater than a first preset threshold, sending, by the UE to the network-side device, the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located; or when an absolute value of a difference between CSI corresponding to a subframe set or a subframe subset that includes and is indicated by a subframe in which the first CSI reporting trigger information is located and CSI corresponding to a subframe set or a subframe subset that includes and is indicated by a subframe in which the second CSI reporting trigger information is located is less than or equal to a first preset threshold, sending, by the UE to the network-side device, the CSI corresponding to the subframe set or the subframe subset that includes and is indicated by the subframe in which the first CSI reporting trigger information is located or the CSI corresponding to the subframe set or the subframe subset that includes and is indicated by the subframe in which the second CSI reporting trigger information is located.

Setting a reporting threshold (the first preset threshold) can save resources used for reporting unnecessary CSI, thereby further improving resource utilization.

With reference to the foregoing possible implementations of the second aspect, in an eleventh possible implementation of the second aspect, the method further includes: when an absolute value of a difference between CSI corresponding to the second subframe set and CSI corresponding to an $i^{th}$ subframe subset in the plurality of subframe subsets is greater than a second preset threshold, sending, by the UE to the network side, the CSI corresponding to the second subframe set and the CSI corresponding to the $i^{th}$ subframe subset in the plurality of subframe subsets, where the $i^{th}$ subframe subset includes subframes in which transmissions are in a downlink direction in i cells in the at least one neighboring cell, and i is an integer greater than 0; or when an absolute value of a difference between CSI corresponding to the second subframe set and CSI corresponding to an $i^{th}$ subframe subset in the plurality of subframe subsets is less than or equal to a second preset threshold, sending, by the UE to the network-side device, the CSI corresponding to the second subframe set or the CSI corresponding to the $i^{th}$ subframe subset in the plurality of subframe subsets.

Setting a reporting threshold (the second preset threshold) can save resources used for reporting unnecessary CSI, thereby further improving resource utilization.

With reference to the foregoing possible implementations of the second aspect, in a twelfth possible implementation of the second aspect, the method further includes: when an absolute value of a difference between CSI corresponding to the second subframe set and CSI corresponding to a first subframe subset in n subframe subsets is greater than a third preset threshold, sending, by the UE to the network-side device, the CSI corresponding to the second subframe set and the CSI corresponding to the first subframe subset in the n subframe subsets, where the n subframe subsets are determined by the network-side device based on a sequence of quantities of transmissions that are in a downlink direction in the at least one neighboring cell in one subframe of each subframe subset, the quantities are in a one-to-one correspondence to the n subframe subsets, and the first subframe subset in the n subframe subsets is corresponding to a largest quantity in the quantities; or when an absolute value of a difference between CSI corresponding to the second subframe set and CSI corresponding to a first subframe subset in n subframe subsets is less than or equal to a third preset threshold, sending, by the UE to the network-side device, the CSI corresponding to the second subframe set or the CSI corresponding to the first subframe subset in the n subframe subsets.

With reference to the foregoing possible implementations of the second aspect, in a thirteenth possible implementation of the second aspect, the method further includes: when an absolute value of a difference between CSI corresponding to a $j^{th}$ subframe subset in the n subframe subsets and CSI corresponding to a $(j+1)^{th}$ subframe subset in the n subframe subsets is greater than the third preset threshold, sending, by the UE to the network-side device, the CSI corresponding to the $j^{th}$ subframe subset in the n subframe subsets and the CSI corresponding to the $(j+1)^{th}$ subframe subset in the n subframe subsets, where the quantity corresponding to the $j^{th}$ subframe subset in the n subframe subsets is adjacent to the quantity corresponding to the $(j+1)^{th}$ subframe subset in the n subframe subsets, and the quantity corresponding to the $j^{th}$ subframe subset in the n subframe subsets is greater than the quantity corresponding to the $(j+1)^{th}$ subframe subset in the n subframe subsets; or when an absolute value of a difference between CSI corresponding to a $j^{th}$ subframe subset in the n subframe subsets and CSI corresponding to a $(j+1)^{th}$ subframe subset in the n subframe subsets is less than or equal to the third preset threshold, sending, by the UE to the network-side device, the CSI corresponding to the $j^{th}$ subframe subset in the n subframe subsets or the CSI corresponding to the $(j+1)^{th}$ subframe subset in the n subframe subsets.

With reference to the foregoing possible implementations of the second aspect, in a fourteenth possible implementation of the second aspect, the method further includes: when an absolute value of a difference between CSI corresponding to a first subframe subset in the n subframe subsets and CSI corresponding to a $k^{th}$ subframe subset in the n subframe subsets is greater than the third preset threshold, sending, by the UE to the network-side device, the CSI corresponding to the first subframe subset in the n subframe subsets and the CSI corresponding to the $k^{th}$ subframe subset in the n subframe subsets, where the $k^{th}$ subframe subset in the n subframe subsets is any subframe subset in the n subframe subsets except the first subframe subset in the n subframe subsets; or when an absolute value of a difference between CSI corresponding to a first subframe subset in the n subframe subsets and CSI corresponding to a $k^{th}$ subframe subset in the n subframe subsets is less than or equal to the third preset threshold, sending, by the UE to the network-side device, the CSI corresponding to the first subframe subset in the n subframe subsets or the CSI corresponding to the $k^{th}$ subframe subset in the n subframe subsets.

Setting a reporting threshold (the third preset threshold) can save resources used for reporting unnecessary CSI, thereby further improving resource utilization.

With reference to the foregoing possible implementations of the second aspect, in a fifteenth possible implementation of the second aspect, the method further includes: sending, by the UE, a physical uplink shared channel PUSCH to the network-side device, where the PUSCH carries CSI corresponding to the subframe sets.

With reference to the foregoing possible implementations of the second aspect, in a sixteenth possible implementation of the second aspect, the method further includes: sending, by the UE to the network-side device, a physical uplink control channel PUCCH, where the PUCCH carries at least one of the following: CSI corresponding to the subframe sets, acknowledgement ACK/non-acknowledgement NACK fed back for the configuration information, and a scheduling request SR.

With reference to the foregoing possible implementations of the second aspect, in a seventeenth possible implementation of the second aspect, the configuration information further includes CSI reporting periods that are configured for the UE by the network-side device and that are corresponding to the second subframe set and the plurality of subframe subsets, where a CSI reporting period corresponding to the second subframe set is T, a CSI reporting period corresponding to the plurality of second subframe subsets is mT, and m is an integer greater than or equal to 2.

With reference to the foregoing possible implementations of the second aspect, in an eighteenth possible implementation of the second aspect, the method further includes: sending, by the UE, group indexes to the network-side device, where the group indexes are in a one-to-one correspondence to the subframe sets.

Indicating a corresponding subframe set or a corresponding subframe subset by reporting an index can reduce a resource that needs to be occupied by the UE to report a subframe set or a subframe subset when reporting CSI. This can reduce signaling overheads.

A third aspect provides a network-side device that is configured to perform the method according to the first aspect or any possible implementation of the first aspect. Specifically, the network-side device includes units that are configured to perform the method according to the first aspect or any possible implementation of the first aspect.

A fourth aspect provides user equipment UE that is configured to perform the method according to the second aspect or any possible implementation of the second aspect. Specifically, the user equipment UE includes units that are configured to perform the method according to the second aspect or any possible implementation of the second aspect.

A fifth aspect provides a network-side device. The network-side device includes: a receiver, a transmitter, a memory, a processor, and a bus system. The receiver, the transmitter, the memory, and the processor are connected by using the bus system. The memory is configured to store an instruction. The processor is configured to execute the instruction stored in the memory, so as to control the receiver to receive a signal and control the transmitter to send a signal. In addition, when the processor executes the instruction stored in the memory, the execution enables the processor to perform the method according to the first aspect or any possible implementation of the first aspect.

A sixth aspect provides user equipment. The user equipment includes: a receiver, a transmitter, a memory, a processor, and a bus system. The receiver, the transmitter, the memory, and the processor are connected by using the bus system. The memory is configured to store an instruction. The processor is configured to execute the instruction stored in the memory, so as to control the receiver to receive a signal and control the transmitter to send a signal. In addition, when the processor executes the instruction stored in the memory, the execution enables the processor to perform the method according to the second aspect or any possible implementation of the second aspect.

A seventh aspect provides a computer readable medium that is configured to store a computer program. The computer program includes an instruction that is used to perform the method according to the first aspect or any possible implementation of the first aspect.

An eighth aspect provides a computer readable medium that is configured to store a computer program. The computer program includes an instruction that is used to perform the method according to the second aspect or any possible implementation of the second aspect.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied to various communications systems, such as: a Global System for Mobile Communications (Global System for Mobile Communications, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, a Universal Mobile Telecommunications System (Universal Mobile Telecommunications System, UMTS), a Worldwide Interoperability for Microwave Access (Worldwide Interoperability for Microwave Access, WiMAX) communications system, or a future 5G system.

Figure 3:
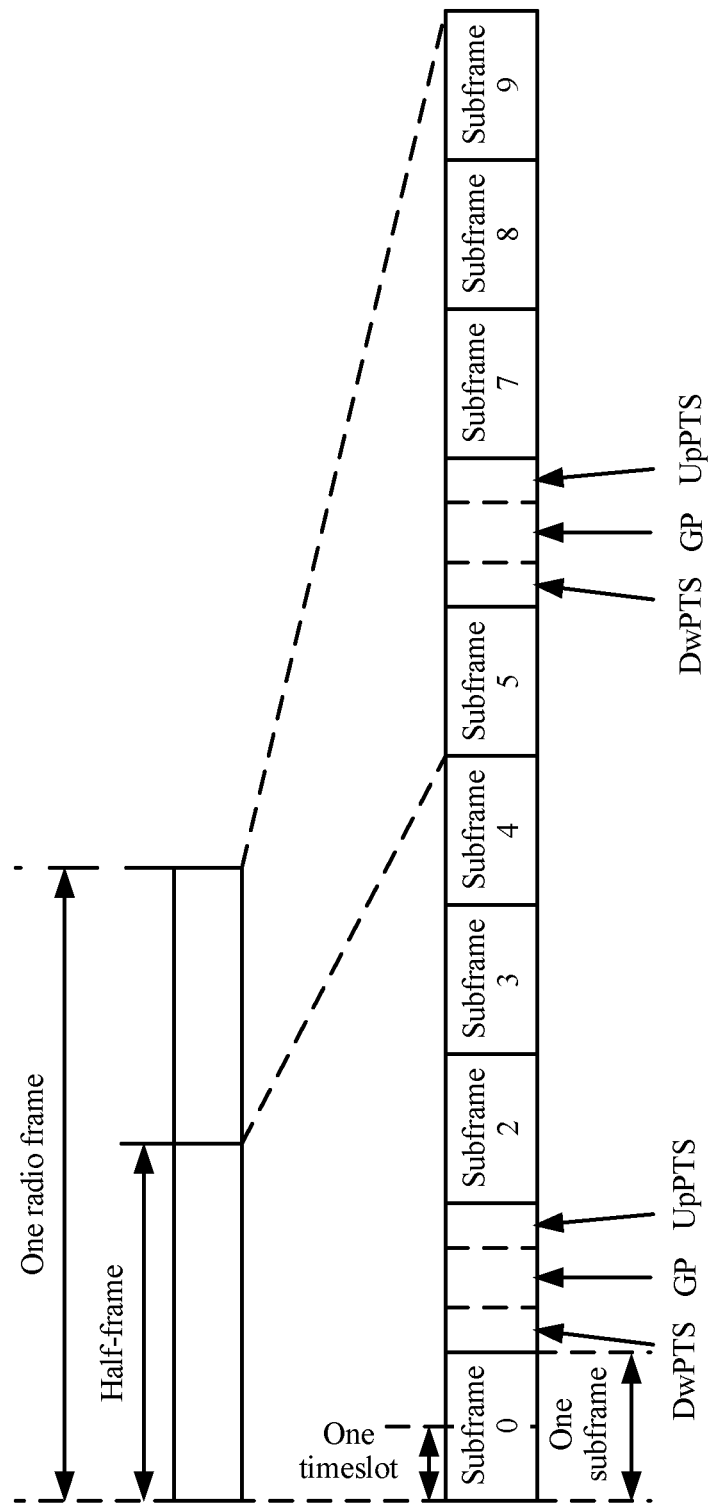
FIG. 3 is a schematic block diagram of a subframe structure according to an embodiment of the present invention.

FIG. 3 shows a frame structure in an LTE TDD system. One radio frame has a length of 10 ms and includes two half-frames, where each half-frame is 5 ms long. Each half-frame includes five subframes that are classified into special subframes and standard subframes. Each subframe is 1 ms long. A special subframe includes a downlink pilot timeslot (Downlink Pilot Slot, DwPTS) used for downlink transmission, a guard period (Guard Period, GP) used between uplink transmission and downlink transmission, and an uplink pilot timeslot (Uplink Pilot Slot, UpPTS) used for uplink transmission. The standard subframes include an uplink subframe and a downlink subframe and are used to transmit uplink/downlink control channels, uplink/downlink service data, and the like. In the LTE TDD, different uplink-downlink configurations of subframes are supported, and uplink-downlink configurations of subframes can be adjusted based on different service types to meet asymmetric uplink and downlink service requirements.

Figures 4, 5:
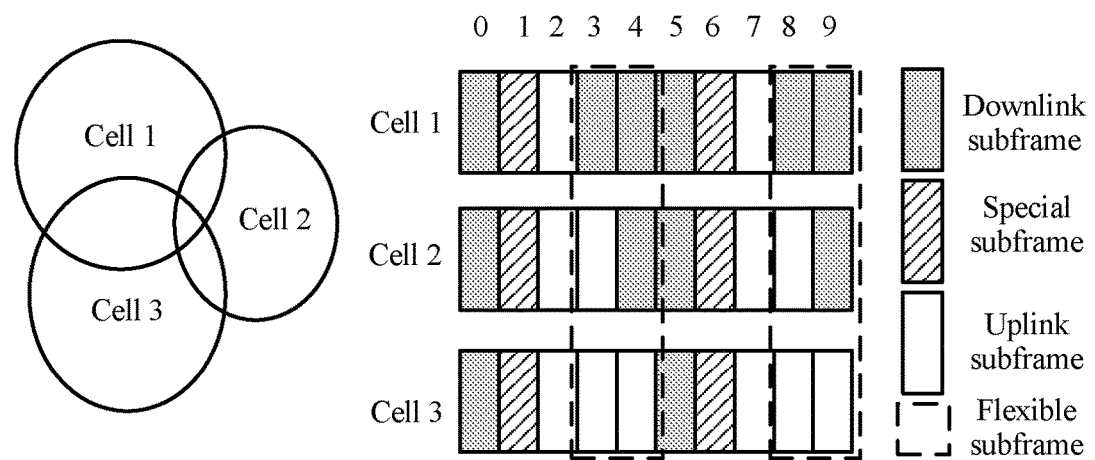
FIG. 4 is a schematic block diagram of different uplink-downlink configurations of subframes according to an embodiment of the present invention.
FIG. 5 is a schematic diagram of different uplink-downlink configurations of subframes used in neighboring cells according to an embodiment of the present invention.

FIG. 4 shows uplink-downlink configurations of subframes supported by the foregoing frame structure, where D indicates that the subframe is used for downlink transmission, U indicates that the subframe is used for uplink transmission, and S indicates a special subframe. It can be seen from FIG. 4 that a subframe 0 and a subframe 5 are always used for downlink transmission, a subframe 1 is always a special subframe, and a subframe 2 is always used for uplink transmission. Therefore, the subframes 0, 1, 2, and 5 may be referred to as fixed subframes, and the other subframes may be referred to as flexible subframes. In specific implementation, the fixed subframes and the flexible subframes may change based on different uplink-downlink configurations of the subframes.

FIG. 5 is a schematic diagram of different uplink-downlink configurations of subframes used in neighboring cells. As shown in FIG. 5, a cell 1, a cell 2, and a cell 3 are three neighboring cells. Within a period of time, the different uplink-downlink configurations of subframes shown in FIG. 4 are used on the frequency band f4 shown in FIG. 1 in the three cells. The cell 1 uses the configuration 2, the cell 2 uses the configuration 1, and the cell 3 uses the configuration 0. In this case, subframes 0, 1, 2, 5, 6, and 7 may be referred to as fixed subframes, and subframes 3, 4, 8, and 9 may be referred to as flexible subframes. Cross timeslot interference may occur in the flexible subframes due to the different uplink-downlink configurations of subframes. For example, for the cell 1, in the downlink subframe 3 and the downlink subframe 8, the cell 1 receives uplink interference from UE in the cell 2 and UE in the cell 3; and in the downlink subframe 4 and the downlink subframe 9, the cell 1 receives downlink interference from an eNB serving the cell 2 and uplink interference from the UE in the cell 3. In other words, for the cell 1, the interference to the subframes 3 and 8 is different from the interference to the subframes 4 and 9. In the foregoing case, a mechanism of reporting uniform CSI is applied in the prior art, and therefore, the eNB cannot learn CSI of the subframes that is more accurate. Consequently, a time frequency resource and an MCS that are selected during UE scheduling may be inappropriate, and resource utilization is reduced.

To resolve the foregoing problem, the embodiments of the present invention provide a method for measuring CSI. The following describes in detail the method for measuring CSI in the embodiments of the present invention.

Figure 2:
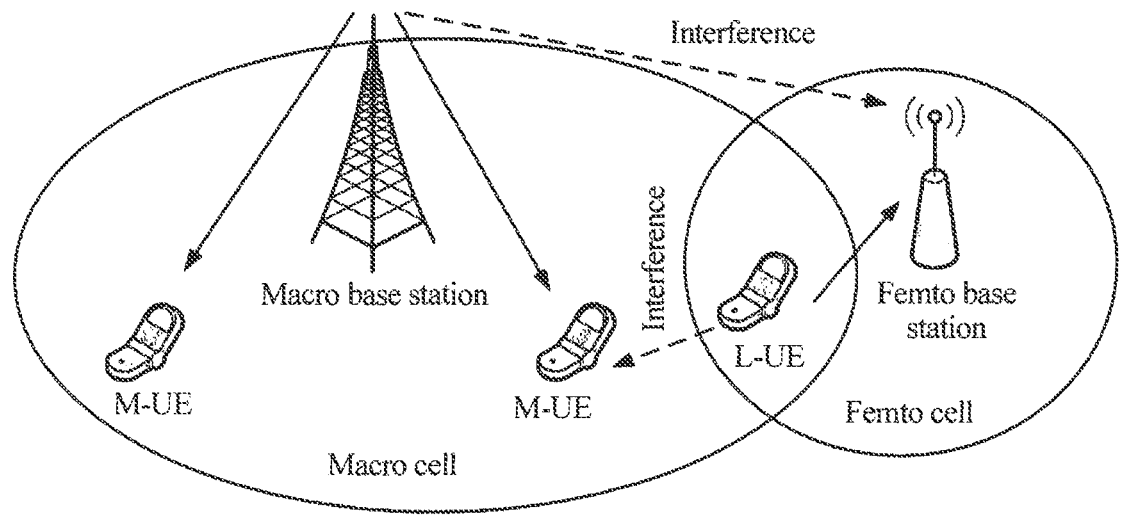
FIG. 2 is a schematic block diagram of cross timeslot interference between TDD neighboring cells.
Figure 6:
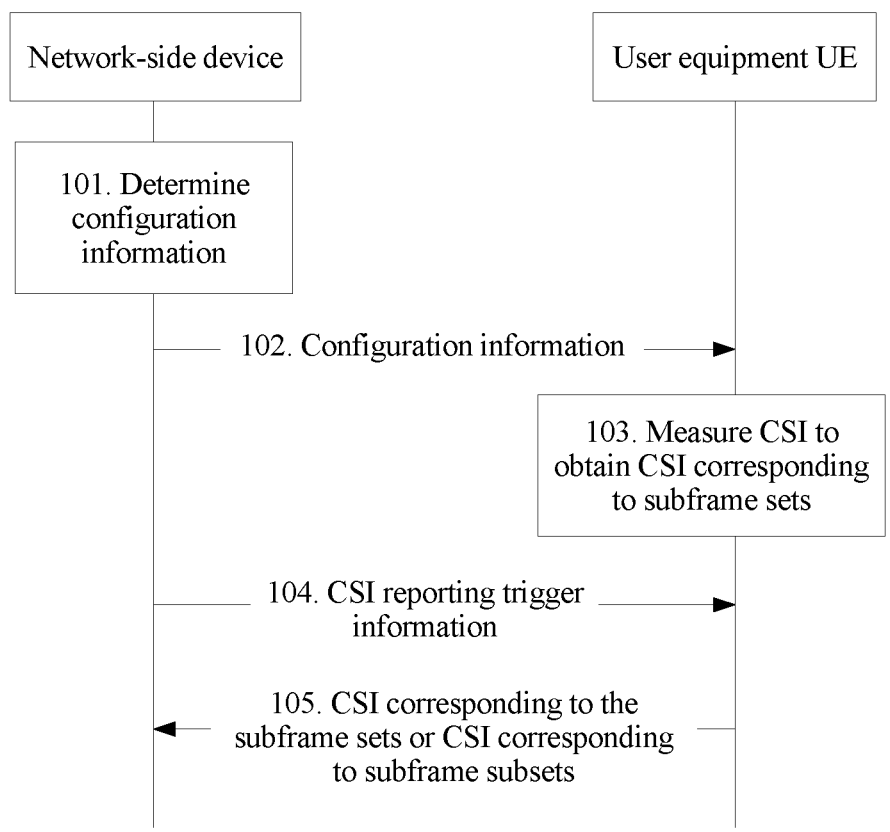
FIG. 6 is a schematic flowchart of a method for measuring CSI according to an embodiment of the present invention.

FIG. 6 is a schematic flowchart of a method for measuring CSI according to an embodiment of the present invention. This method may be applied to the scenario shown in FIG. 2, and more specifically, may be applied to a scenario in which the uplink-downlink configurations of subframes shown in FIG. 5 are used in neighboring cells. However, this embodiment of the present invention does not impose a limitation thereto.

101. A network-side device determines configuration information. The configuration information is used to configure UE to perform CSI measurement on different subframe sets on a flexible frequency band or sub-bands of a flexible frequency band. The subframe sets are determined by the network-side device based on uplink-downlink configurations of subframes on the flexible frequency band or the sub-bands of the flexible frequency band in a target cell and at least one neighboring cell of the target cell.

The network-side device in this embodiment of the present invention may be a base transceiver station (Base Transceiver Station, BTS) in a GSM system or a Code Division Multiple Access (Code Division Multiple Access, CDMA) system, may be a NodeB (NodeB, NB) in a WCDMA system, may be an eNB in an LTE system, or may be network-side device in a future 5G network. The present invention does not impose a limitation thereto.

In this embodiment of the present invention, the target cell has at least one neighboring cell. In addition, uplink-downlink configurations of subframes in the target cell are different from uplink-downlink configurations of subframes in at least one neighboring cell of the target cell.

Figure 1:
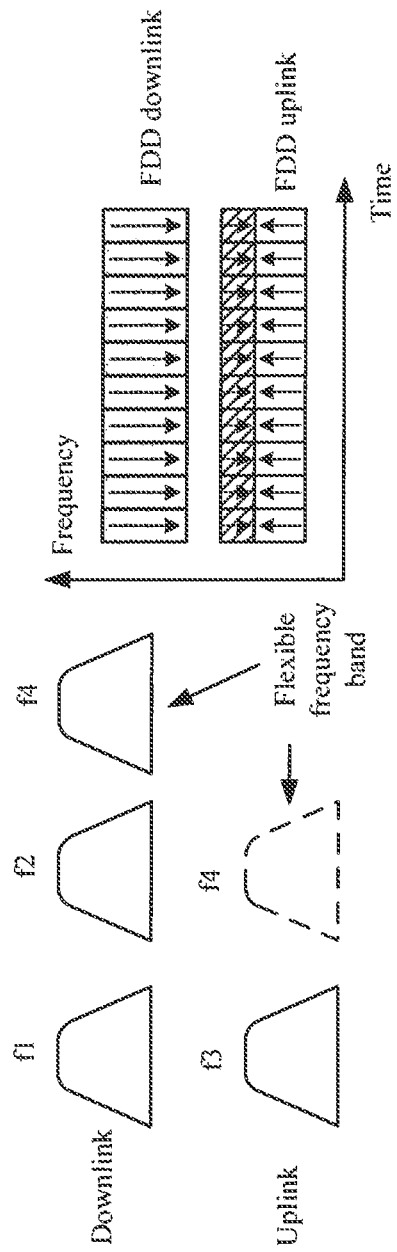
FIG. 1 is a schematic block diagram of flexible duplex frequency bands.

The foregoing flexible frequency band is a frequency band on which a transmission direction is configurable, for example, may be the frequency band f4 shown in FIG. 1. The network-side device may use a uniform uplink-downlink configuration for subframes on the frequency band f4 within a period of time, or may use a uniform uplink-downlink configuration for subframes in some sub-bands on the frequency band f4 within a period of time.

Specifically, the network-side device determines the different subframe sets based on the uplink-downlink configurations of the subframes on the flexible frequency band or the sub-bands of the flexible frequency band in the target cell and the at least one neighboring cell of the target cell. For example, the network-side device may determine the different subframe sets based on an interference type of mutual interference between the target cell and the at least one neighboring cell. For another example, the network-side device may separately determine, based on whether indexes of the sub-bands of the flexible frequency band are odd numbers or even numbers, a subframe set on a sub-band with an odd index number and a subframe set on a sub-band with an even index number. The subframe set in the sub-band with an odd index number and the subframe set in the sub-band with an even index number may be same sets or may be different sets.

Optionally, the subframe sets may include a first subframe set and/or a second subframe set.

Optionally, the first subframe set may include subframes in which transmissions in the neighboring cell are not all in a downlink direction. In other words, if there is only one neighboring cell, transmissions in the neighboring cell are in an uplink direction in a subframe belonging to the first subframe set; and if there is more than one neighboring cell, in a subframe belonging to the first subframe set, a transmission in one neighboring cell may be in a downlink direction and a transmission in another neighboring cell may be in an uplink direction. The second subframe set includes subframes in which transmissions in the neighboring cell are all in a downlink direction. In other words, transmissions in all the neighboring cell are all in a downlink direction in a subframe belonging to the second subframe set. For example, based on transmission directions in neighboring cells in a subframe, the network-side device may group the subframes 3, 4, 8, and 9 shown in FIG. 5 into the first subframe set denoted as S1={3,4,8,9} and group the subframe 0 and the subframe 5 into the second subframe set denoted as S2={0,5}.

Optionally, the subframe sets are determined by the network-side device based on an interference type of mutual interference between the target cell and the at least one neighboring cell.

Optionally, the network-side device determines an interference level of a subframe of the UE based on the interference type, where the configuration information includes CSI measurement resources and/or subframe sets, and the CSI measurement resources and the subframe sets are corresponding to different interference levels and are determined by the network-side device based on the interference levels of subframes of the UE.

102. The network-side device sends the configuration information to UE.

For example, the configuration information may be used to configure the UE to perform CSI measurement on the first subframe set and/or the second subframe set. For example, the configuration information may be the first subframe set and/or the second subframe set, or may be an index of the first subframe set and/or an index of the second subframe set. After receiving the first subframe set and/or the second subframe set or receiving the index of the first subframe set and/or the index of the second subframe set, the UE can learn a subframe set to be measured, and then can measure CSI of the corresponding subframe set based on a cell-specific reference signal (Cell Reference Signal, CRS).

Optionally, the network-side device may send the configuration information to the UE by using broadcast signaling, higher layer signaling, or physical layer L1 signaling.

Optionally, the network-side device may send the configuration information to the UE by using the broadcast signaling, the higher layer signaling, or the physical layer L1 signaling on a first carrier of a plurality of carriers.

Optionally, when uplink-downlink configurations of subframes are the same on a plurality of carriers in any one of the at least one neighboring cell and uplink-downlink configurations of subframes are the same on a plurality of carriers in the target cell, the network-side device sends the configuration information to the UE by using the higher layer signaling or the physical layer L1 signaling on the first carrier of the plurality of carriers. The first carrier may be a primary component carrier in the plurality of carriers, or may be a secondary component carrier in the plurality of carriers.

For example, it is assumed that the target cell is the cell 1 in FIG. 5 and the neighboring cells are the cell 2 and the cell 3 in FIG. 5. Three carriers are used in the target cell. If a configuration 2 is used as uplink-downlink configurations of subframes on the three carriers, that is, a carrier 1, a carrier 2, and a carrier 3, in the target cell, a configuration 1 is used as uplink-downlink configurations of subframes on the three carriers in the cell 2, and a configuration 0 is used as uplink-downlink configurations of subframes on the three carriers in the cell 3, the network-side device may send the configuration information to the UE by using the higher layer signaling or the physical layer L1 signaling only on any one of the three carriers, and does not need to send the configuration information on all the carriers. This can reduce signaling overheads.

103. The UE performs CSI measurement based on the configuration information.

The UE performs the CSI measurement on the different subframe sets based on the configuration information, to obtain CSI corresponding to the different subframe sets.

According to the method for measuring channel state information in this embodiment of the present invention, the network-side device determines, based on uplink-downlink configurations of subframes in a neighboring cell, different subframe sets on the flexible frequency band or the subbands of the flexible frequency band, and configures, based on the configuration information, the UE to perform CSI measurement on the different subframe sets. In this way, compared with the prior art in which UE reports uniform CSI, the network-side device can obtain CSI measurement results corresponding to the different subframe sets. In other words, the network-side device can obtain CSI measurement results that are more accurate, so that the network-side device can select an appropriate time frequency resource and an appropriate MCS based on a corresponding subframe set when scheduling the UE, thereby improving resource utilization and system data transmission performance.

In some implementations, the subframe sets are determined by the network-side device based on an interference type of mutual interference between the target cell and the at least one neighboring cell.

In some implementations, the network-side device determines an interference level of a subframe of the UE based on the interference type, where the configuration information includes CSI measurement resources and/or subframe sets, and the CSI measurement resources and the subframe sets are corresponding to different interference levels and are determined by the network-side device based on the interference levels of subframes of the UE.

Optionally, the method may further include: dividing, by the network-side device, the first subframe set into a plurality of subframe subsets, where each of the plurality of subframe subsets includes subframes in which a same quantity of transmissions are in a downlink direction or in an uplink direction in the at least one neighboring cell, where in this case, the configuration information is used to configure the UE to perform CSI measurement on the second subframe set and/or each of the plurality of subframe subsets.

In other words, the network-side device may further divide the foregoing first subframe set. For example, for S1={3,4,8,9}, in the subframe 3 and the subframe 8, transmissions in two neighboring cells are all in an uplink direction, and in the subframe 4 and the subframe 9, transmissions in one of the two neighboring cells are in a downlink direction and transmissions in the other neighboring cell are in an uplink direction. In this case, lower interference may occur in the subframe 3 and the subframe 8, and higher interference may occur in the subframe 4 and the subframe 9. Therefore, the subframe 4 and the subframe 9 may be grouped into one subframe subset denoted as S1.1={4,9}, and the subframe 3 and the subframe 8 may be grouped into another subframe subset denoted as S1.2={3, 8}.

It should be noted that the UE in this embodiment of the present invention may be UE on a cell edge, but the present invention does not impose a limitation thereto.

When the subframe sets are further divided, CSI measurement results that are more accurate can be obtained in the CSI measurement performed by the UE. In this way, the network-side device can select a more appropriate time frequency resource and a more appropriate MCS based on a corresponding subframe set or a corresponding subframe subset when scheduling the UE, so that resource utilization and system data transmission performance are further improved.

Optionally, the configuration information may be further used to indicate CSI reference resources configured in the first subframe set and the second subframe set, and/or a subframe configured with the CSI reference resources, and/or a subframe set to which a subframe configured with the CSI reference resources belongs.

Specifically, the network-side device may select a subframe from the first subframe set and/or the second subframe set, and configure a channel state information CSI reference resource for the UE based on the selected subframe. The network-side device may select one or more subframes from the first subframe set and/or the second subframe set and configure a CSI reference resource for the UE based on the selected subframe, where a quantity of the one or more subframes is less than or equal to a quantity of elements of the subframe set. For example, the network-side device may select the subframe 3 from S1={3,4,8,9} and configure a channel CSI reference resource in the subframe 3. Alternatively, the network-side device may select the subframe 4 from S1={3,4,8,9} and configure a channel CSI reference resource in the subframe 4. For S2={0,5}, the network-side device may select the subframe 0 and configure a CSI resource in the subframe 0, or separately configure a resource on the subframe 0 and the subframe 5. The present invention does not impose a limitation thereto.

In addition, the network-side device may use configuration information to indicate CSI reference resources configured in the first subframe set and the second subframe set. For example, the configuration information may indicate that the CSI reference resources that are configured by the network-side device in the first subframe set and the second subframe set are CSI-RS resources, or may indicate that the CSI reference resources are CSI-IM resources.

In addition, the network-side device may notify, in the configuration information, the UE of the subframe set to which the subframe configured with the CSI reference resources belongs. In this case, the UE can generate, based on a CSI measurement result obtained by performing CSI measurement on the CSI reference resource, CSI corresponding to the subframe set. For example, when the UE performs CSI measurement on the subframe 5, obtained CSI may be used as a measurement result of the subframe set S2; or when the UE performs CSI measurement on the subframe 3, obtained CSI may be used as a measurement result of the subframe set S1. In addition, the UE may perform CSI measurement on both the subframe 0 and the subframe 5, and an average value of a sum of the two obtained CSI may be used as a measurement result of the subframe set S2. Similar measurement may be performed on the subframe set S1. The present invention does not impose a limitation thereto.

Optionally, the configuration information is further used to indicate a subframe configured with CSI reference resources configured in the second subframe set and each of the plurality of subframe subsets, and/or a subframe configured with the CSI reference resources, and/or a subframe set or a subframe subset to which a subframe configured with the CSI reference resources belongs.

Specifically, the network-side device may select a subframe from the second subframe set and/or each of the plurality of subframe subsets, and configure a channel state information CSI reference resource for the UE based on the selected subframe. In addition, the network-side device may notify, in the configuration information, the UE of the subframe set or the subframe subset to which the subframe configured with the CSI reference resources belongs. Specific operations in this method are similar to related operations in the foregoing method, and reference may be made to the foregoing descriptions. For brevity, details are not described herein again.

Optionally, the CSI reference resources may include a channel state information reference signal CSI-RS resource, or may include a cell-specific pilot CRS resource.

For example, the network-side device may configure a CSI-RS resource for the UE, so that the UE performs channel state measurement. For example, for subframe sets S1.1, S1.2, and S2, the network-side device may separately configure CSI-RS resources in subframes 4, 3, and 0. The UE may measure CSI in the subframes 4, 3, and 0 and report obtained corresponding CSI respectively as CSI for the subframe sets S1.1, S1.2, and S2.

Optionally, the CSI-RS may be a non-zero power channel state information reference signal NZP-CSI-RS and/or a zero power CSI-RS.

A main purpose of the NZP-CSI-RS is to enable the UE to measure strength of an interfering signal and feed back the strength to the network-side device. A main purpose of the zero power CSI-RS is to enable the UE to measure strength of a reference signal and feed back the strength to the network-side device.

Optionally, the CSI reference resources may further include a channel state information interference measurement CSI-IM resource.

Specifically, the network-side device may configure a CSI-IM resource for the UE, so that the UE performs interference measurement. For different subframe sets or subframe subsets, CSI-IM resources configured by the network-side device may be different. The following provides descriptions by using an example in which base stations serving the cell 1, the cell 2, and the cell 3 shown in FIG. 5 are respectively a base station 1, a base station 2, and a base station 3.

Case 1: For a subframe, such as a subframe 4, in which transmissions in the cell 1 and in the cell 2 are in a downlink direction and transmissions in the cell 3 are in an uplink direction, the base station 1 may configure a set of CSI-IM resources in the cell 1: The cell 1 may be cleared from a corresponding CSI-IM resource location, and the cell 2 and the cell 3 may fill data in corresponding CSI-IM resource locations and properly send the data. When performing interference measurement, the UE can obtain interference information that includes interference generated in respective transmissions of the base station 2 and the base station 3. The base station 2 may configure another set of CSI-IM resources in the cell 2: The cell 2 may be cleared from a corresponding CSI-IM resource location, and the cell 1 and the cell 3 may fill data in corresponding CSI-IM resource locations and properly send the data. When performing interference measurement, the UE can obtain interference information that includes interference generated in respective transmissions of the base station 2 and the base station 3. In addition, the base station 1 may configure a set of CSI-RS resources in the cell 1: The cell 1 may transmit data in a corresponding CSI-RS resource location, and the cell 2 and the cell 3 may be cleared from corresponding CSI-RS resource locations. In this way, when performing CSI measurement, the UE can obtain CSI that does not include interference generated in respective transmissions of the base station 2 and the base station 3. Alternatively, the base station 2 may configure another set of CSI-RS resources in the cell: The cell 2 may transmit data in a corresponding CSI-RS resource location, and the cell 1 and the cell 3 may be cleared from corresponding CSI-RS resource locations. In this way, when performing CSI measurement, the UE can obtain CSI that does not include interference generated in respective transmissions of the base station 2 and the base station 3.

It should be understood that if transmissions in more cells are in a downlink direction in a corresponding subframe, similarly, the base station needs to configure more sets of CSI-IM resources and/or CSI-RS resources. In addition, all CSI-IM resource configurations and CSI-RS resource configurations are different for any base station.

Case 2: For a subframe, such as a subframe 3, in which transmissions in the cell 1 are in a downlink direction and transmissions in the cell 2 and in the cell 3 are in an uplink direction, the base station 1 may configure a set of CSI-IM resources in the cell 1: The cell 1 may be cleared from a corresponding CSI-IM resource location, and the cell 2 and the cell 3 may fill data in corresponding CSI-IM resource locations and properly send the data. When performing interference measurement, the UE can obtain interference information that includes interference generated in uplink transmissions of the base station 2 and the base station 3. In addition, the base station 1 may configure a set of CSI-RS resources in the cell 1: The cell 1 may transmit data in a corresponding CSI-RS resource location, and the cell 2 and the cell 3 may be cleared from corresponding CSI-IM resource locations. In this way, when performing CSI measurement, the UE can obtain CSI that does not include interference generated in uplink transmissions of the base station 2 and the base station 3.

It should be further understood that, in the foregoing two cases, the subframes are in different time domain locations, and therefore, the CSI-IM resources do not need to be limited to different configurations. However, in a same subframe, the CSI-IM resources configured by the base station need to be limited to different configurations.

Optionally, the method may further include the following steps: 104. The network-side device sends CSI reporting trigger information to the UE. 105. The network-side device receives CSI sent by the UE and corresponding to a subframe set that includes and is indicated by a subframe in which the CSI reporting trigger information is located.

Specifically, the network-side device sends aperiodic CSI reporting trigger information to the UE. For example, the network-side device may send a channel state information request CSI request to the UE. Then, the UE may report CSI based on a subframe that includes and is indicated by a subframe in which the trigger information is located.

For example, subframes in which three different CSI requests are located are respectively subframes 0, 3, and 4 and respectively indicate the subframes 0, 3, and 4. Then, when receiving the CSI requests in the subframes 0, 3, and 4, the UE may report, to the network-side device, CSI corresponding to a subframe set S2 to which the subframe 0 belongs, CSI corresponding to a subframe set S1.2 to which the subframe 3 belongs, and CSI corresponding to a subframe set S1.1 to which the subframe 4 belongs.

CSI can be reported aperiodically by using a subframe set or a subframe subset that is indicated by a subframe in which trigger information is located.

Optionally, in step 105 in which the network-side device receives the CSI sent by the UE and corresponding to a subframe set that includes and is indicated by a subframe in which the CSI reporting trigger information is located: When an absolute value of a difference between CSI corresponding to a subframe set that includes and is indicated by a subframe in which first CSI reporting trigger information is located and CSI corresponding to a subframe set that includes and is indicated by a subframe in which second CSI reporting trigger information is located is greater than a first preset threshold, the network-side device may receive the CSI sent by the UE and corresponding to the subframe set that includes and is indicated by the subframe in which the first CSI reporting trigger information is located and the CSI sent by the UE and corresponding to the subframe set that includes and is indicated by the subframe in which the second CSI reporting trigger information is located; or when an absolute value of a difference between CSI corresponding to a subframe set that includes and is indicated by a subframe in which first CSI reporting trigger information is located and CSI corresponding to a subframe set that includes and is indicated by a subframe in which second CSI reporting trigger information is located is less than or equal to a first preset threshold, the network-side device receives the CSI corresponding to the subframe set that includes and is indicated by the subframe in which the first CSI reporting trigger information is located or the CSI corresponding to the subframe set that includes and is indicated by the subframe in which the second CSI reporting trigger information is located.

In other words, when the UE reports CSI aperiodically, the network-side device may preset a reporting threshold, that is, the first preset threshold. When an absolute value of a difference between CSI corresponding to two subframe sets is greater than the first preset threshold, it indicates that the CSI corresponding to the two subframe sets differs greatly, and in this case, the UE may report both the CSI corresponding to the two subframe sets; or when an absolute value of a difference between CSI corresponding to two subframe sets is less than or equal to the first preset threshold, it indicates that the CSI corresponding to the two subframe sets is relatively close to each other, and in this case, the UE may report the CSI corresponding to any one of the two subframe sets, and the network-side device considers by default that the CSI reported by the UE is the CSI corresponding to the other subframe set.

Setting a reporting threshold (the first preset threshold) can save resources used for reporting unnecessary CSI, thereby further improving resource utilization.

Optionally, the method may further include: receiving, by the network side, CSI sent by the UE and corresponding to the second subframe set and CSI sent by the UE and corresponding to an $i^{th}$ subframe subset in the plurality of subframe subsets, where an absolute value of a difference between the CSI corresponding to the second subframe set and the CSI corresponding to the $i^{th}$ subframe subset in the plurality of subframe subsets is greater than a second preset threshold, the $i^{th}$ subframe subset includes subframes in which transmissions are in a downlink direction in i cells in the at least one neighboring cell, and i is an integer greater than 0; or receiving, by the network-side device, CSI sent by the UE and corresponding to the second subframe set or CSI sent by the UE and corresponding to an $i^{th}$ subframe subset in the plurality of subframe subsets, where an absolute value of a difference between the CSI corresponding to the second subframe set and the CSI corresponding to the $i^{th}$ subframe subset in the plurality of subframe subsets is less than or equal to a second preset threshold.

Specifically, when the UE reports CSI, the network-side device may also preset a reporting threshold, that is, the second preset threshold. Before reporting CSI, the UE may sequentially compare CSI corresponding to each of the plurality of subframe subsets and the CSI corresponding to the second subframe set. If an absolute value of a difference between the two CSI values is greater than the second preset threshold, the UE reports both the two CSI values; or if an absolute value of a difference between the two CSI values is less than or equal to the second preset threshold, the UE reports only one of the two CSI values, and the network-side device considers by default that the CSI reported by the UE is the CSI corresponding to the other subframe set or the other subframe subset. In this way, resources used for reporting unnecessary CSI can be reduced, and resource utilization can be further improved.

Optionally, the method may further include: determining, by the network-side device based on a sequence of quantities of transmissions that are in a downlink direction or in an uplink direction in the at least one neighboring cell in one subframe of each subframe subset, n subframe subsets in a one-to-one correspondence to the quantities; and receiving, by the network-side device, CSI sent by the UE and corresponding to the second subframe set and CSI sent by the UE and corresponding to a first subframe subset in the n subframe subsets, where an absolute value of a difference between the CSI corresponding to the second subframe set and the CSI corresponding to the first subframe subset in the n subframe subsets is greater than a third preset threshold, and the first subframe subset in the n subframe subsets is corresponding to a largest quantity in the quantities; or receiving, by the network-side device, CSI sent by the UE and corresponding to the second subframe set or CSI sent by the UE and corresponding to a first subframe subset in the n subframe subsets, where an absolute value of a difference between the CSI corresponding to the second subframe set and the CSI corresponding to the first subframe subset in the n subframe subsets is less than or equal to a third preset threshold.

For example, the first subframe subset may be S1.1 in S1.1 and S1.2. If an absolute value of a difference between CSI corresponding to S1.1 and CSI corresponding to S2 is greater than the third preset threshold, the UE reports, to the network-side device, the CSI corresponding to S1.1 and the CSI corresponding to S2; or if an absolute value of a difference between CSI corresponding to S1.1 and CSI corresponding to S2 is less than or equal to the third preset threshold, the UE reports, to the network-side device, the CSI corresponding to S1.1 or the CSI corresponding to S2.

Optionally, the method may further include: receiving, by the network-side device, CSI sent by the UE and corresponding to a $j^{th}$ subframe subset in the n subframe subsets and CSI sent by the UE and corresponding to a $(j+1)^{th}$ subframe subset in the n subframe subsets, where an absolute value of a difference between the CSI corresponding to the $j^{th}$ subframe subset in the n subframe subsets and the CSI corresponding to the $(j+1)^{th}$ subframe subset in the n subframe subsets is greater than the third preset threshold, the quantity corresponding to the $j^{th}$ subframe subset in the n subframe subsets is adjacent to the quantity corresponding to the $(j+1)^{th}$ subframe subset in the n subframe subsets, and the quantity corresponding to the $j^{th}$ subframe subset in the n subframe subsets is greater than the quantity corresponding to the $(j+1)^{th}$ subframe subset in the n subframe subsets; or receiving, by the network-side device, CSI sent by the UE and corresponding to a $j^{th}$ subframe subset in the n subframe subsets or CSI sent by the UE and corresponding to a $(j+1)^{th}$ subframe subset in the n subframe subsets, where an absolute value of a difference between the CSI corresponding to the $j^{th}$ subframe subset in the n subframe subsets and the CSI corresponding to the $(j+1)^{th}$ subframe subset in the n subframe subsets is less than or equal to the third preset threshold.

In other words, the UE can compare two subframe subsets that have similar interference statuses, for example, the subframe subsets S1.1 and S1.2, and report two CSI values or one CSI value based on the CSI respectively corresponding to the two subframe subsets.

Optionally, the method may further include: receiving, by the network-side device, CSI sent by the UE and corresponding to a first subframe subset in the n subframe subsets and CSI sent by the UE and corresponding to a $k^{th}$ subframe subset in the n subframe subsets, where an absolute value of a difference between the CSI corresponding to the first subframe subset in the n subframe subsets and the CSI corresponding to the $k^{th}$ subframe subset in the n subframe subsets is greater than the third preset threshold, and the $k^{th}$ subframe subset in the n subframe subsets is any subframe subset in the n subframe subsets except the first subframe subset in the n subframe subsets; or receiving, by the network-side device, CSI sent by the UE and corresponding to a first subframe subset in the n subframe subsets or CSI sent by the UE and corresponding to a $k^{th}$ subframe subset in the n subframe subsets, where an absolute value of a difference between the CSI corresponding to the first subframe subset in the n subframe subsets and the CSI corresponding to the $k^{th}$ subframe subset in the n subframe subsets is less than or equal to the third preset threshold.

In other words, the UE can first compare the first subframe subset with (n−1) subframe subsets in the n subframe subsets except the first subframe subset, and report CSI based on a comparison result.

In this embodiment of the present invention, when a difference between CSI corresponding to two subframe sets or subframe subsets is relatively small, the UE may stop sending CSI, so that power of the UE and signaling overheads can be reduced.

Setting a reporting threshold can save resources used for reporting unnecessary CSI, thereby further improving resource utilization.

It should be understood that the first preset threshold, the second preset threshold, and the third preset threshold may be the same or may be different. The present invention does not impose a limitation thereto.

Optionally, the configuration information may further include CSI reporting periods that are configured for the UE by the network-side device and that are corresponding to the second subframe set and the plurality of subframe subsets.

A CSI reporting period corresponding to the second subframe set is T, a CSI reporting period corresponding to the plurality of second subframe subsets is mT, and m is an integer greater than or equal to 2.

For example, if there are two subframe subsets, when reporting CSI periodically, the UE may report, to the network-side device at an interval of the period T, CSI corresponding to the second subframe set, report, at an interval of a period 2T, CSI corresponding to one of the two subframe sets, and report, at an interval of a period 3T, CSI corresponding to the other of the two subframe sets.

Optionally, the method may further include: receiving, by the network-side device, a physical uplink shared channel PUSCH sent by the UE, where the PUSCH carries CSI corresponding to the subframe sets.

Specifically, the UE may add, to a PUSCH, CSI corresponding to the first subframe set and the second subframe set, or may add, to a PUCCH, CSI corresponding to the subframe sets, for example, may add, to the PUCCH, CSI corresponding to the first subframe set and the first subframe set. More specifically, when there is a PUSCH in a subframe in which CSI is to be reported, the UE tends to add, to the PUSCH, CSI corresponding to the subframe sets.

Optionally, the method may further include: receiving, by the network-side device, a physical uplink control channel PUCCH sent by the UE, where the PUCCH carries at least one of the following: CSI corresponding to the subframe sets, ACK/NACK fed back for the configuration information, and a scheduling request SR.

Specifically, when there is only a PUCCH in a subframe in which CSI is to be reported, the PUCCH carries at least one of the following: the CSI corresponding to the subframe sets, the ACK/NACK, and the SR.

Optionally, the method may further include: receiving, by the network-side device, group indexes that are sent by the UE, where the group indexes are in a one-to-one correspondence to the subframe sets. In other words, when sending the CSI, the UE simultaneously sends an index corresponding to the CSI. In this way, when receiving the CSI and the index corresponding to the CSI, the network side can learn a subframe set that is reported by the UE and that is corresponding to the CSI or a subframe subset that is reported by the UE and that is corresponding to the CSI.

Indicating a corresponding subframe set or a corresponding subframe subset by reporting an index can reduce a resource that needs to be occupied by the UE to report a subframe set or a subframe subset when reporting CSI. This can reduce signaling overheads.

It should be understood that the magnitude of the serial numbers of the processes does not mean an execution sequence. The execution sequence of the processes is determined by functions and internal logic of the processes and shall not be construed as any limitation to implementation processes of this embodiment of the present invention.

According to the method for measuring channel state information in this embodiment of the present invention, the network-side device determines, based on uplink-downlink configurations of subframes in a neighboring cell, different subframe sets on the flexible frequency band or the subbands of the flexible frequency band, and configures, based on the configuration information, the UE to perform CSI measurement on the different subframe sets. In this way, compared with the prior art in which UE reports uniform CSI, the network-side device can obtain CSI measurement results corresponding to the different subframe sets. In other words, the network-side device can obtain CSI measurement results that are more accurate, so that the network-side device can select an appropriate time frequency resource and an appropriate MCS based on a corresponding subframe set when scheduling the UE, thereby improving resource utilization and system data transmission performance.

The foregoing has described in detail methods for measuring CSI according to the embodiments of the present invention with reference to FIG. 1 to FIG. 6. The following describes in detail a network-side device and user equipment according to the embodiments of the present invention with reference to FIG. 7 to FIG. 10.

Figure 7:
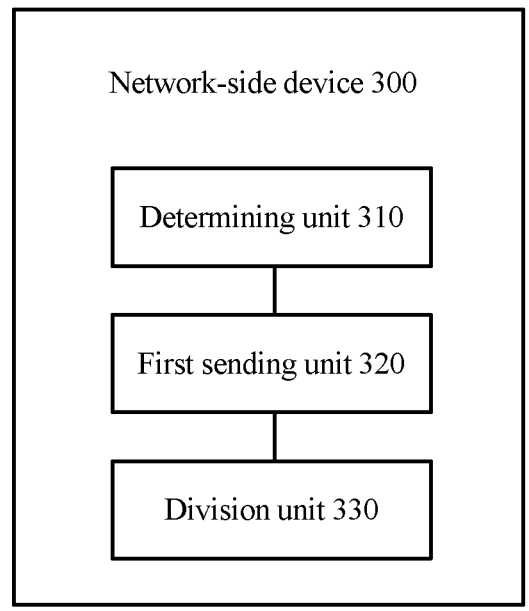
FIG. 7 is a schematic block diagram of a network-side device according to an embodiment of the present invention.

FIG. 7 is a schematic block diagram of a network-side device 300 according to an embodiment of the present invention. The network-side device 300 includes a determining unit 310 and a first sending unit 320.

The determining unit 310 is configured to determine configuration information. The configuration information is used to configure user equipment UE to perform CSI measurement on different subframe sets on a flexible frequency band or sub-bands of a flexible frequency band. The subframe sets are determined by the network-side device based on uplink-downlink configurations of subframes on the flexible frequency band or the sub-bands of the flexible frequency band in a target cell and at least one neighboring cell of the target cell. The flexible frequency band is a frequency band on which a transmission direction is configurable.

Optionally, the different subframe sets include a first subframe set and/or a second subframe set.

Optionally, the first subframe set includes subframes in which transmissions in the target cell are in a downlink direction and transmissions in the at least one neighboring cell are not all in a downlink direction, and the second subframe set includes subframes in which transmissions in the target cell and the at least one neighboring cell are all in a downlink direction.

Optionally, the subframe sets are determined by the network-side device based on an interference type of mutual interference between the target cell and the at least one neighboring cell.

Optionally, the network-side device determines an interference level of a subframe of the UE based on the interference type, where the configuration information includes CSI measurement resources and/or subframe sets, and the CSI measurement resources and the subframe sets are corresponding to different interference levels and are determined by the network-side device based on the interference levels of subframes of the UE.

The first sending unit 320 is configured to send the configuration information to the UE, so that the UE performs the CSI measurement based on the configuration information.

In this embodiment of the present invention, the network-side device determines, based on uplink-downlink configurations of subframes in a neighboring cell, different subframe sets on the flexible frequency band or the sub-bands of the flexible frequency band, and configures, based on the configuration information, the UE to perform CSI measurement on the different subframe sets. In this way, compared with the prior art in which UE reports uniform CSI, the network-side device can obtain CSI measurement results corresponding to the different subframe sets. In other words, the network-side device can obtain CSI measurement results that are more accurate, so that the network-side device can select an appropriate time frequency resource and an appropriate MCS based on a corresponding subframe set when scheduling the UE, thereby improving resource utilization and system data transmission performance.

Optionally, the network-side device 300 further includes: a division unit 330, configured to divide the first subframe set into a plurality of subframe subsets, where each of the plurality of subframe subsets includes subframes in which a same quantity of transmissions are in a downlink direction or in an uplink direction in the at least one neighboring cell, and the configuration information is used to configure the UE to perform CSI measurement on the first subframe set and/or each of the plurality of subframe subsets.

When the subframe sets are further divided, CSI measurement results that are more accurate can be obtained in the CSI measurement performed by the UE. In this way, the network-side device can select a more appropriate time frequency resource and a more appropriate MCS based on a corresponding subframe set or a corresponding subframe subset when scheduling the UE, so that resource utilization and system data transmission performance are further improved.

Optionally, the configuration information is further used to indicate CSI reference resources configured in the first subframe set and the second subframe set, and/or a subframe configured with the CSI reference resources, and/or a subframe set to which a subframe configured with the CSI reference resources belongs.

Optionally, the configuration information is further used to indicate CSI reference resources configured in the second subframe set and each of the plurality of subframe subsets, and/or a subframe configured with the CSI reference resources, and/or a subframe set or a subframe subset to which a subframe configured with the CSI reference resources belongs.

Optionally, the CSI reference resources include a cell-specific pilot CRS resource and/or a channel state information reference signal CSI-RS resource.

Optionally, the CSI reference resources further include a channel state information interference measurement CSI-IM resource.

Optionally, the CSI-RS resource is a non-zero power channel state information reference signal NZP-CSI-RS and/or a zero power channel state information reference signal CSI-RS.

Optionally, the first sending unit 320 is specifically configured to: send the configuration information to the UE by using broadcast signaling, higher layer signaling, or physical layer L1 signaling.

Optionally, the first sending unit 320 is specifically configured to: send the configuration information to the UE by using the broadcast signaling, the higher layer signaling, or the physical layer L1 signaling on a first carrier of a plurality of carriers.

Optionally, the first sending unit 320 is further specifically configured to: when uplink-downlink configurations of subframes are the same on a plurality of carriers in any one of the at least one neighboring cell and uplink-downlink configurations of subframes are the same on a plurality of carriers in the target cell, send the configuration information to the UE by using the broadcast signaling, the higher layer signaling, or the physical layer L1 signaling on the first carrier of the plurality of carriers.

Optionally, the network-side device 300 further includes: a second sending unit, configured to send CSI reporting trigger information to the UE; and a first receiving unit, configured to receive CSI sent by the UE and corresponding to a subframe set or a subframe subset that includes and is indicated by a subframe in which the CSI reporting trigger information is located.

Optionally, the first receiving unit is specifically configured to: receive CSI sent by the UE and corresponding to a subframe set or a subframe subset that includes and is indicated by a subframe in which first CSI reporting trigger information is located and CSI sent by the UE and corresponding to a subframe set or a subframe subset that includes and is indicated by a subframe in which second CSI reporting trigger information is located, where an absolute value of a difference between the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located is greater than a first preset threshold; or receive CSI corresponding to a subframe set or a subframe subset that includes and is indicated by a subframe in which first CSI reporting trigger information is located, or CSI corresponding to a subframe set or a subframe subset that includes and is indicated by a subframe in which second CSI reporting trigger information is located, where an absolute value of a difference between the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located is less than or equal to a first preset threshold.

Optionally, the network-side device 300 further includes: a second receiving unit, configured to receive CSI sent by the UE and corresponding to the second subframe set and CSI sent by the UE and corresponding to an $i^{th}$ subframe subset in the plurality of subframe subsets, where an absolute value of a difference between the CSI corresponding to the second subframe set and the CSI corresponding to the $i^{th}$ subframe subset in the plurality of subframe subsets is greater than a second preset threshold, the $i^{th}$ subframe subset includes subframes in which transmissions are in a downlink direction in i cells in the at least one neighboring cell, and i is an integer greater than 0; or receive CSI sent by the UE and corresponding to the second subframe set or CSI sent by the UE and corresponding to an $i^{th}$ subframe subset in the plurality of subframe subsets, where an absolute value of a difference between the CSI corresponding to the second subframe set and the CSI corresponding to the $i^{th}$ subframe subset in the plurality of subframe subsets is less than or equal to a second preset threshold.

Optionally, the determining unit 310 is further configured to: determine, based on a sequence of quantities of transmissions that are in a downlink direction in the at least one neighboring cell in one subframe of each subframe subset, n subframe subsets in a one-to-one correspondence to the quantities. The network-side device further includes a third receiving unit, configured to: receive CSI sent by the UE and corresponding to the second subframe set and CSI sent by the UE and corresponding to a first subframe subset in the n subframe subsets, where an absolute value of a difference between the CSI corresponding to the second subframe set and the CSI corresponding to the first subframe subset in the n subframe subsets is greater than a third preset threshold, and the first subframe subset in the n subframe subsets is corresponding to a largest quantity in the quantities; or receive CSI sent by the UE and corresponding to the second subframe set or CSI sent by the UE and corresponding to a first subframe subset in the n subframe subsets, where an absolute value of a difference between the CSI corresponding to the second subframe set and the CSI corresponding to the first subframe subset in the n subframe subsets is less than or equal to a third preset threshold.

Optionally, the third receiving unit is specifically configured to: receive CSI sent by the UE and corresponding to a $j^{th}$ subframe subset in the n subframe subsets and CSI sent by the UE and corresponding to a $(j+1)^{th}$ subframe subset in the n subframe subsets, where an absolute value of a difference between the CSI corresponding to the $j^{th}$ subframe subset in the n subframe subsets and the CSI corresponding to the $(j+1)^{th}$ subframe subset in the n subframe subsets is greater than the third preset threshold, the quantity corresponding to the $j^{th}$ subframe subset in the n subframe subsets is adjacent to the quantity corresponding to the $(j+1)^{th}$ subframe subset in the n subframe subsets, and the quantity corresponding to the $j^{th}$ subframe subset in the n subframe subsets is greater than the quantity corresponding to the $(j+1)^{th}$ subframe subset in the n subframe subsets; or receive CSI sent by the UE and corresponding to a $j^{th}$ subframe subset in the n subframe subsets or CSI sent by the UE and corresponding to a $(j+1)^{th}$ subframe subset in the n subframe subsets, where an absolute value of a difference between the CSI corresponding to the $j^{th}$ subframe subset in the n subframe subsets and the CSI corresponding to the $(j+1)^{th}$ subframe subset in the n subframe subsets is less than or equal to the third preset threshold.

Optionally, the third receiving unit is specifically configured to: receive CSI sent by the UE and corresponding to a first subframe subset in the n subframe subsets and CSI sent by the UE and corresponding to a $k^{th}$ subframe subset in the n subframe subsets, where an absolute value of a difference between the CSI corresponding to the first subframe subset in the n subframe subsets and the CSI corresponding to the $k^{th}$ subframe subset in the n subframe subsets is greater than the third preset threshold, and the $k^{th}$ subframe subset in the n subframe subsets is any subframe subset in the n subframe subsets except the first subframe subset in the n subframe subsets; or receive, by the network-side device, CSI sent by the UE and corresponding to a first subframe subset in the n subframe subsets or CSI sent by the UE and corresponding to a $k^{th}$ subframe subset in the n subframe subsets, where an absolute value of a difference between the CSI corresponding to the first subframe subset in the n subframe subsets and the CSI corresponding to the $k^{th}$ subframe subset in the n subframe subsets is less than or equal to the third preset threshold.

Optionally, the network-side device 300 further includes: a fourth receiving unit, configured to receive a physical uplink shared channel PUSCH sent by the UE, where the PUSCH carries CSI corresponding to the subframe sets.

Optionally, the network-side device 300 further includes: a fifth receiving unit, configured to receive a physical uplink control channel PUCCH sent by the UE, where the PUCCH carries at least one of the following: CSI corresponding to the subframe sets, acknowledgement ACK/non-acknowledgement NACK fed back for the configuration information, and a scheduling request SR.

Optionally, the configuration information further includes CSI reporting periods that are configured for the UE by the network-side device and that are corresponding to the second subframe set and the plurality of subframe subsets, where a CSI reporting period corresponding to the second subframe set is T, a CSI reporting period corresponding to the plurality of first subframe subsets is mT, and m is an integer greater than or equal to 2.

Optionally, the network-side device 300 further includes: a sixth receiving unit, configured to receive group indexes that are sent by the UE, where the group indexes are in a one-to-one correspondence to the subframe sets.

It should be understood that the network-side device 300 herein is implemented in a form of a functional unit. The term "unit" herein may refer to an application-specific integrated circuit (Application Specific Integrated Circuit, ASIC), an electronic circuit, a processor configured to execute one or more software or firmware program (for example, a shared processor, a dedicated processor, or a group processor) and a memory, a combinational logic circuit, and/or another appropriate component that supports the described functions. In an optional example, a person skilled in the art can understand that the network-side device 300 may be specifically the network-side device in the foregoing embodiment, and the network-side device 300 may be configured to perform the processes and/or the steps corresponding to the network-side device in the foregoing method embodiments. To avoid repetition, details are not described herein again.

Figure 8:
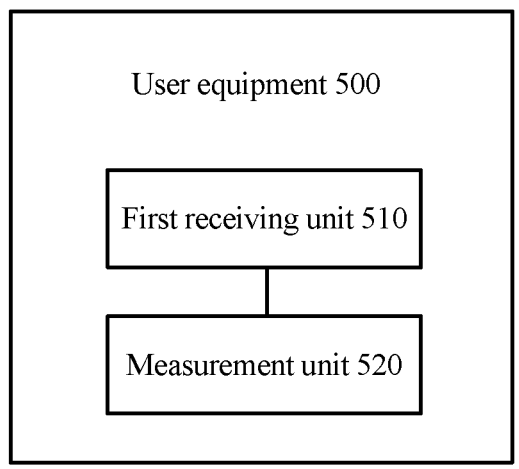
FIG. 8 is a schematic block diagram of user equipment according to an embodiment of the present invention.

FIG. 8 is a schematic block diagram of user equipment 500 according to an embodiment of the present invention. The user equipment 500 includes a first receiving unit 510 and a measurement unit 520.

The first receiving unit 510 is configured to receive configuration information sent by a network-side device, where the configuration information is used to configure the user equipment UE to perform CSI measurement on different subframe sets on a flexible frequency band or sub-bands of a flexible frequency band, the subframe sets are determined by the network-side device based on uplink-downlink configurations of subframes on the flexible frequency band or the sub-bands of the flexible frequency band in a target cell and at least one neighboring cell of the target cell, and the flexible frequency band is a frequency band on which a transmission direction is configurable.

The measurement unit 520 is configured to perform the CSI measurement based on the configuration information.

Optionally, the subframe sets include a first subframe set and/or a second subframe set, and the measurement unit 520 is specifically configured to: perform the CSI measurement on the first subframe set and/or the second subframe set based on the configuration information.

Optionally, the first subframe set includes subframes in which transmissions in the target cell are in a downlink direction and transmissions in the at least one neighboring cell are not all in a downlink direction, and the second subframe set includes subframes in which transmissions in the target cell and the at least one neighboring cell are all in a downlink direction.

Optionally, the subframe sets are determined by the network-side device based on an interference type of mutual interference between the target cell and the at least one neighboring cell.

Optionally, the network-side device determines an interference level of a subframe of the UE based on the interference type, where the configuration information includes CSI measurement resources and/or subframe sets, and the CSI measurement resources and the subframe sets are corresponding to different interference levels and are determined by the network-side device based on the interference levels of subframes of the UE.

In this embodiment of the present invention, the network-side device determines, based on uplink-downlink configurations of subframes in a neighboring cell, different subframe sets on the flexible frequency band or the sub-bands of the flexible frequency band, and configures, based on the configuration information, the UE to perform CSI measurement on the different subframe sets. In this way, compared with the prior art in which UE reports uniform CSI, the network-side device can obtain CSI measurement results corresponding to the different subframe sets. In other words, the network-side device can obtain CSI measurement results that are more accurate, so that the network-side device can select an appropriate time frequency resource and an appropriate MCS based on a corresponding subframe set when scheduling the UE, thereby improving resource utilization and system data transmission performance.

Optionally, the measurement unit 520 is specifically configured to: perform the CSI measurement on the second subframe set and/or all of a plurality of subframe subsets, where the plurality of subframe subsets are obtained by the network-side device by dividing the first subframe set, and each of the plurality of subframe subsets includes subframes in which a same quantity of transmissions are in a downlink direction in the at least one neighboring cell.

Optionally, the configuration information is further used to indicate CSI reference resources configured in the first subframe set and the second subframe set, and/or a subframe configured with the CSI reference resources, and/or a subframe set to which a subframe configured with the CSI reference resources belongs.

Optionally, the configuration information is further used to indicate CSI reference resources configured in the second subframe set and each of the plurality of subframe subsets, and/or a subframe configured with the CSI reference resources, and/or a subframe set or a subframe subset to which a subframe configured with the CSI reference resources belongs.

Optionally, the CSI reference resources include a cell-specific pilot CRS resource and/or a channel state information reference signal CSI-RS resource.

Optionally, the CSI reference resources further include a channel state information interference measurement CSI-IM resource.

Optionally, the CSI-RS resource is a non-zero power channel state information reference signal NZP-CSI-RS and/or a zero power channel state information reference signal CSI-RS.

Optionally, the first receiving unit 510 is specifically configured to: receive the configuration information sent by the network-side device by using broadcast signaling, higher layer signaling, or physical layer L1 signaling.

Optionally, the first receiving unit 510 is specifically configured to: receive the configuration information sent by the network-side device by using the broadcast signaling, the higher layer signaling, or the physical layer L1 signaling on a first carrier of a plurality of carriers.

Optionally, the first receiving unit 510 is specifically configured to: when uplink-downlink configurations of subframes are the same on a plurality of carriers in any one of the at least one neighboring cell and uplink-downlink configurations of subframes are the same on a plurality of carriers in the target cell, receive the configuration information sent by the network-side device by using the broadcast signaling, the higher layer signaling, or the physical layer L1 signaling on the first carrier of the plurality of carriers.

Optionally, the user equipment 500 further includes: a second receiving unit, configured to receive CSI reporting trigger information sent by the network-side device; and a first sending unit, configured to send, to the network-side device, CSI corresponding to a subframe set or a subframe subset that includes and is indicated by a subframe in which the CSI reporting trigger information is located.

Optionally, the second receiving unit is specifically configured to: receive first CSI reporting trigger information and second CSI reporting trigger information that are sent by the network-side device; and the first sending unit is specifically configured to: when an absolute value of a difference between CSI corresponding to a subframe set or a subframe subset that includes and is indicated by a subframe in which the first CSI reporting trigger information is located and CSI corresponding to a subframe set or a subframe subset that includes and is indicated by a subframe in which the second CSI reporting trigger information is located is greater than a first preset threshold, send, to the network-side device, the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located; or when an absolute value of a difference between CSI corresponding to a subframe set or a subframe subset that includes and is indicated by a subframe in which the first CSI reporting trigger information is located and CSI corresponding to a subframe set or a subframe subset that includes and is indicated by a subframe in which the second CSI reporting trigger information is located is less than or equal to a first preset threshold, send, to the network-side device, the CSI corresponding to the subframe set or the subframe subset that includes and is indicated by the subframe in which the first CSI reporting trigger information is located or the CSI corresponding to the subframe set or the subframe subset that includes and is indicated by the subframe in which the second CSI reporting trigger information is located.

Optionally, the user equipment 500 further includes: a second sending unit, configured to: when an absolute value of a difference between CSI corresponding to the second subframe set and CSI corresponding to an $i^{th}$ subframe subset in the plurality of subframe subsets is greater than a second preset threshold, send, to the network side, the CSI corresponding to the second subframe set and the CSI corresponding to the $i^{th}$ subframe subset in the plurality of subframe subsets, where the $i^{th}$ subframe subset includes subframes in which transmissions are in a downlink direction in i cells in the at least one neighboring cell, and i is an integer greater than 0; or when an absolute value of a difference between CSI corresponding to the second subframe set and CSI corresponding to an $i^{th}$ subframe subset in the plurality of subframe subsets is less than or equal to a second preset threshold, send, to the network-side device, the CSI corresponding to the second subframe set or the CSI corresponding to the $i^{th}$ subframe subset in the plurality of subframe subsets.

Optionally, the user equipment 500 further includes: a third sending unit, configured to: when an absolute value of a difference between CSI corresponding to the second subframe set and CSI corresponding to a first subframe subset in n subframe subsets is greater than a third preset threshold, send, to the network-side device, the CSI corresponding to the second subframe set and the CSI corresponding to the first subframe subset in the n subframe subsets, where the n subframe subsets are determined by the network-side device based on a sequence of quantities of transmissions that are in a downlink direction in the at least one neighboring cell in one subframe of each subframe subset, the quantities are in a one-to-one correspondence to the n subframe subsets, and the first subframe subset in the n subframe subsets is corresponding to a largest quantity in the quantities; or when an absolute value of a difference between CSI corresponding to the second subframe set and CSI corresponding to a first subframe subset in n subframe subsets is less than or equal to a third preset threshold, send, to the network-side device, the CSI corresponding to the second subframe set or the CSI corresponding to the first subframe subset in the n subframe subsets.

Optionally, the third sending unit is specifically configured to: when an absolute value of a difference between CSI corresponding to a $j^{th}$ subframe subset in the n subframe subsets and CSI corresponding to a $(j+1)^{th}$ subframe subset in the n subframe subsets is greater than the third preset threshold, send, to the network-side device, the CSI corresponding to the $j^{th}$ subframe subset in the n subframe subsets and the CSI corresponding to the $(j+1)^{th}$ subframe subset in the n subframe subsets, where the quantity corresponding to the $j^{th}$ subframe subset in the n subframe subsets is adjacent to the quantity corresponding to the $(j+1)^{th}$ subframe subset in the n subframe subsets, and the quantity corresponding to the $j^{th}$ subframe subset in the n subframe subsets is greater than the quantity corresponding to the $(j+1)^{th}$ subframe subset in the n subframe subsets; or when an absolute value of a difference between CSI corresponding to a $j^{th}$ subframe subset in the n subframe subsets and CSI corresponding to a $(j+1)^{th}$ subframe subset in the n subframe subsets is less than or equal to the third preset threshold, send, to the network-side device, the CSI corresponding to the $j^{th}$ subframe subset in the n subframe subsets or the CSI corresponding to the $(j+1)^{th}$ subframe subset in the n subframe subsets.

Optionally, the third sending unit is specifically configured to: when an absolute value of a difference between CSI corresponding to a first subframe subset in the n subframe subsets and CSI corresponding to a $k^{th}$ subframe subset in the n subframe subsets is greater than the third preset threshold, send, to the network-side device, the CSI corresponding to the first subframe subset in the n subframe subsets and the CSI corresponding to the $k^{th}$ subframe subset in the n subframe subsets, where the $k^{th}$ subframe subset in the n subframe subsets is any subframe subset in the n subframe subsets except the first subframe subset in the n subframe subsets; or when an absolute value of a difference between CSI corresponding to a first subframe subset in the n subframe subsets and CSI corresponding to a $k^{th}$ subframe subset in the n subframe subsets is less than or equal to the third preset threshold, send, to the network-side device, the CSI corresponding to the first subframe subset in the n subframe subsets or the CSI corresponding to the $k^{th}$ subframe subset in the n subframe subsets.

Optionally, the user equipment 500 further includes: a fourth sending unit, configured to send a physical uplink shared channel PUSCH to the network-side device, where the PUSCH carries CSI corresponding to the subframe sets.

Optionally, the user equipment 500 further includes: a fifth sending unit, configured to send, to the network-side device, a physical uplink control channel PUCCH, where the PUCCH carries at least one of the following: CSI corresponding to the subframe sets, acknowledgement ACK/non-acknowledgement NACK fed back for the configuration information, and a scheduling request SR.

Optionally, the configuration information further includes CSI reporting periods that are configured for the UE by the network-side device and that are corresponding to the second subframe set and the plurality of subframe subsets, where a CSI reporting period corresponding to the second subframe set is T, a CSI reporting period corresponding to the plurality of second subframe subsets is mT, and m is an integer greater than or equal to 2.

Optionally, the user equipment 500 further includes: a sixth sending unit, configured to send group indexes to the network-side device, where the group indexes are in a one-to-one correspondence to the subframe sets.

It should be understood that the user equipment 500 herein is implemented in a form of a functional unit. The term "unit" herein may refer to an application-specific integrated circuit (Application Specific Integrated Circuit, ASIC), an electronic circuit, a processor configured to execute one or more software or firmware program (for example, a shared processor, a dedicated processor, or a group processor) and a memory, a combinational logic circuit, and/or another appropriate component that supports the described functions. In an optional example, a person skilled in the art can understand that the user equipment 500 may be specifically the user equipment UE in the foregoing embodiment, and the user equipment 500 may be configured to perform the processes and/or the steps corresponding to the user equipment UE in the foregoing method embodiments. To avoid repetition, details are not described herein again.

Figure 9:
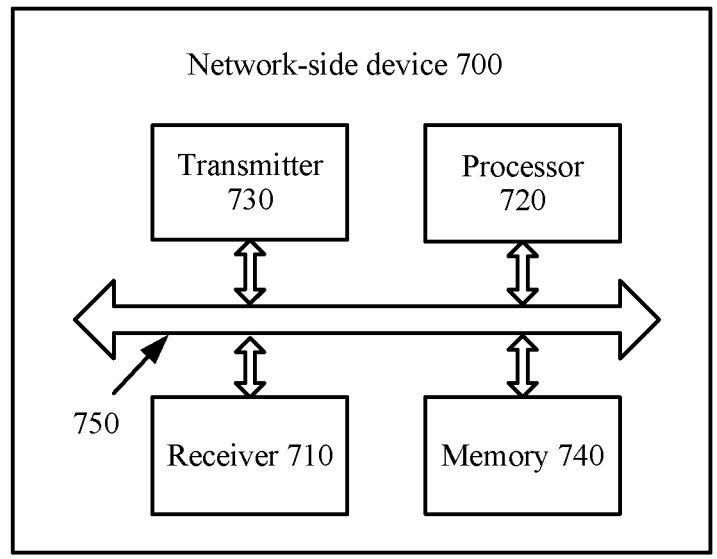
FIG. 9 is a schematic block diagram of a network-side device according to another embodiment of the present invention.

FIG. 9 is a schematic block diagram of a network-side device 700 according to an embodiment of the present invention. The network-side device 700 includes a receiver 710, a processor 720, a transmitter 730, a memory 740, and a bus system 750. The receiver 710, the processor 720, the transmitter 730, and the memory 730 are connected by using the bus system 750. The memory 740 is configured to store an instruction. The processor 720 is configured to execute the instruction stored in the memory 740, so as to control the receiver 710 to receive a signal and control the transmitter 730 to send the instruction.

The processor 720 is configured to determine configuration information, where the configuration information is used to configure user equipment UE to perform CSI measurement on different subframe sets on a flexible frequency band or sub-bands of a flexible frequency band, the subframe sets are determined by the network-side device based on uplink-downlink configurations of subframes on the flexible frequency band or the sub-bands of the flexible frequency band in a target cell and at least one neighboring cell of the target cell, and the flexible frequency band is a frequency band on which a transmission direction is configurable.

Optionally, the different subframe sets include a first subframe set and/or a second subframe set.

Optionally, the first subframe set includes subframes in which transmissions in the target cell are in a downlink direction and transmissions in the at least one neighboring cell are not all in a downlink direction, and the second subframe set includes subframes in which transmissions in the target cell and the at least one neighboring cell are all in a downlink direction.

Optionally, the subframe sets are determined by the network-side device based on an interference type of mutual interference between the target cell and the at least one neighboring cell.

Optionally, the network-side device determines an interference level of a subframe of the UE based on the interference type, where the configuration information includes CSI measurement resources and/or subframe sets, and the CSI measurement resources and the subframe sets are corresponding to different interference levels and are determined by the network-side device based on the interference levels of subframes of the UE.

The transmitter 730 is configured to send the configuration information to the user equipment UE, so that the UE performs the CSI measurement based on the configuration information.

In this embodiment of the present invention, the network-side device determines, based on uplink-downlink configurations of subframes in a neighboring cell, different subframe sets on the flexible frequency band or the sub-bands of the flexible frequency band, and configures, based on the configuration information, the UE to perform CSI measurement on the different subframe sets. In this way, compared with the prior art in which UE reports uniform CSI, the network-side device can obtain CSI measurement results corresponding to the different subframe sets. In other words, the network-side device can obtain CSI measurement results that are more accurate, so that the network-side device can select an appropriate time frequency resource and an appropriate MCS based on a corresponding subframe set when scheduling the UE, thereby improving resource utilization and system data transmission performance.

Optionally, the processor 720 is further configured to divide the first subframe set into a plurality of subframe subsets, where each of the plurality of subframe subsets includes subframes in which a same quantity of transmissions are in a downlink direction or in an uplink direction in the at least one neighboring cell. The transmitter 730 is specifically configured to: send the configuration information to the UE, where the configuration information is used to configure the UE to perform CSI measurement on the second subframe set and/or each of the plurality of subframe subsets.

Optionally, the configuration information is further used to indicate CSI reference resources configured in the first subframe set and the second subframe set, and/or a subframe configured with the CSI reference resources, and/or a subframe set to which a subframe configured with the CSI reference resources belongs.

Optionally, the configuration information is further used to indicate CSI reference resources configured in the second subframe set and each of the plurality of subframe subsets, and/or a subframe configured with the CSI reference resources, and/or a subframe set or a subframe subset to which a subframe configured with the CSI reference resources belongs.

Optionally, the CSI reference resources include a cell-specific pilot CRS resource and/or a channel state information reference signal CSI-RS resource.

Optionally, the CSI reference resources further include a channel state information interference measurement CSI-IM resource.

Optionally, the CSI-RS resource is a non-zero power channel state information reference signal NZP-CSI-RS and/or a zero power channel state information reference signal CSI-RS.

Optionally, the transmitter 730 is specifically configured to: send the configuration information to the UE by using broadcast signaling, higher layer signaling, or physical layer L1 signaling.

Optionally, the transmitter 730 is specifically configured to: send the configuration information to the UE by using the broadcast signaling, the higher layer signaling, or the physical layer L1 signaling on a first carrier of a plurality of carriers.

Optionally, the transmitter 730 is specifically configured to: when uplink-downlink configurations of subframes are the same on a plurality of carriers in any one of the at least one neighboring cell and uplink-downlink configurations of subframes are the same on a plurality of carriers in the target cell, send the configuration information to the UE by using the broadcast signaling, the higher layer signaling, or the physical layer L1 signaling on the first carrier of the plurality of carriers.

Optionally, the transmitter 730 is further configured to send CSI reporting trigger information to the UE; and the receiver 710 is configured to receive CSI sent by the UE and corresponding to a subframe set or a subframe subset that includes and is indicated by a subframe in which the CSI reporting trigger information is located.

Optionally, the receiver 710 is specifically configured to: receive CSI sent by the UE and corresponding to a subframe set or a subframe subset that includes and is indicated by a subframe in which first CSI reporting trigger information is located and CSI sent by the UE and corresponding to a subframe set or a subframe subset that includes and is indicated by a subframe in which second CSI reporting trigger information is located, where an absolute value of a difference between the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located is greater than a first preset threshold; or receive CSI corresponding to a subframe set or a subframe subset that includes and is indicated by a subframe in which first CSI reporting trigger information is located, or CSI corresponding to a subframe set or a subframe subset that includes and is indicated by a subframe in which second CSI reporting trigger information is located, where an absolute value of a difference between the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located is less than or equal to a first preset threshold.

Optionally, the receiver 710 is further configured to: receive CSI sent by the UE and corresponding to the second subframe set and CSI sent by the UE and corresponding to an $i^{th}$ subframe subset in the plurality of subframe subsets, where an absolute value of a difference between the CSI corresponding to the second subframe set and the CSI corresponding to the $i^{th}$ subframe subset in the plurality of subframe subsets is greater than a second preset threshold, the $i^{th}$ subframe subset includes subframes in which transmissions are in a downlink direction in i cells in the at least one neighboring cell, and i is an integer greater than 0; or receive CSI sent by the UE and corresponding to the second subframe set or CSI sent by the UE and corresponding to an $i^{th}$ subframe subset in the plurality of subframe subsets, where an absolute value of a difference between the CSI corresponding to the second subframe set and the CSI corresponding to the $i^{th}$ subframe subset in the plurality of subframe subsets is less than or equal to a second preset threshold.

Optionally, the processor 720 is further configured to: determine, based on a sequence of quantities of transmissions that are in a downlink direction in the at least one neighboring cell in one subframe of each subframe subset, n subframe subsets in a one-to-one correspondence to the quantities; and the receiver 710 is further configured to: receive CSI sent by the UE and corresponding to the second subframe set and CSI sent by the UE and corresponding to a first subframe subset in the n subframe subsets, where an absolute value of a difference between the CSI corresponding to the second subframe set and the CSI corresponding to the first subframe subset in the n subframe subsets is greater than a third preset threshold, and the first subframe subset in the n subframe subsets is corresponding to a largest quantity in the quantities; or receive CSI sent by the UE and corresponding to the second subframe set or CSI sent by the UE and corresponding to a first subframe subset in the n subframe subsets, where an absolute value of a difference between the CSI corresponding to the second subframe set and the CSI corresponding to the first subframe subset in the n subframe subsets is less than or equal to a third preset threshold.

Optionally, the receiver 710 is specifically configured to: receive CSI sent by the UE and corresponding to a $j^{th}$ subframe subset in the n subframe subsets and CSI sent by the UE and corresponding to a $(j+1)^{th}$ subframe subset in the n subframe subsets, where an absolute value of a difference between the CSI corresponding to the $j^{th}$ subframe subset in the n subframe subsets and the CSI corresponding to the $(j+1)^{th}$ subframe subset in the n subframe subsets is greater than the third preset threshold, the quantity corresponding to the $j^{th}$ subframe subset in the n subframe subsets is adjacent to the quantity corresponding to the $(j+1)^{th}$ subframe subset in the n subframe subsets, and the quantity corresponding to the $j^{th}$ subframe subset in the n subframe subsets is greater than the quantity corresponding to the $(j+1)^{th}$ subframe subset in the n subframe subsets; or receive CSI sent by the UE and corresponding to a $j^{th}$ subframe subset in the n subframe subsets or CSI sent by the UE and corresponding to a $(j+1)^{th}$ subframe subset in the n subframe subsets, where an absolute value of a difference between the CSI corresponding to the $j^{th}$ subframe subset in the n subframe subsets and the CSI corresponding to the $(j+1)^{th}$ subframe subset in the n subframe subsets is less than or equal to the third preset threshold.

Optionally, the receiver 710 is specifically configured to: receive CSI sent by the UE and corresponding to a first subframe subset in the n subframe subsets and CSI sent by the UE and corresponding to a $k^{th}$ subframe subset in the n subframe subsets, where an absolute value of a difference between the CSI corresponding to the first subframe subset in the n subframe subsets and the CSI corresponding to the $k^{th}$ subframe subset in the n subframe subsets is greater than the third preset threshold, and the $k^{th}$ subframe subset in the n subframe subsets is any subframe subset in the n subframe subsets except the first subframe subset in the n subframe subsets; or receive, by the network-side device, CSI sent by the UE and corresponding to a first subframe subset in the n subframe subsets or CSI sent by the UE and corresponding to a $k^{th}$ subframe subset in the n subframe subsets, where an absolute value of a difference between the CSI corresponding to the first subframe subset in the n subframe subsets and the CSI corresponding to the $k^{th}$ subframe subset in the n subframe subsets is less than or equal to the third preset threshold.

Optionally, the receiver 710 is further configured to: receive a physical uplink shared channel PUSCH sent by the UE, where the PUSCH carries CSI corresponding to the subframe sets.

Optionally, the receiver 710 is further configured to: receive a physical uplink control channel PUCCH sent by the UE, where the PUCCH carries at least one of the following: CSI corresponding to the subframe sets, acknowledgement ACK/non-acknowledgement NACK fed back for the configuration information, and a scheduling request SR.

Optionally, the configuration information further includes CSI reporting periods that are configured for the UE by the network-side device and that are corresponding to the second subframe set and the plurality of subframe subsets, where a CSI reporting period corresponding to the second subframe set is T, a CSI reporting period corresponding to the plurality of first subframe subsets is mT, and m is an integer greater than or equal to 2.

Optionally, the receiver 710 is further configured to: receive group indexes that are sent by the UE, where the group indexes are in a one-to-one correspondence to the subframe sets.

It should be understood that the network-side device 700 may be specifically the network-side device in the foregoing embodiment, and may be configured to perform the steps and/or the processes corresponding to the network-side device in the foregoing method embodiments. Optionally, the memory 740 may include a read-only memory and a random access memory and provide an instruction and data to the processor. A part of the memory may further include a non-volatile random access memory. For example, the memory may further store information about a device type. The processor 720 may be configured to execute the instruction stored in the memory; and when the processor executes the instruction, the processor may perform the steps corresponding to the network-side device in the foregoing method embodiments.

Figure 10:
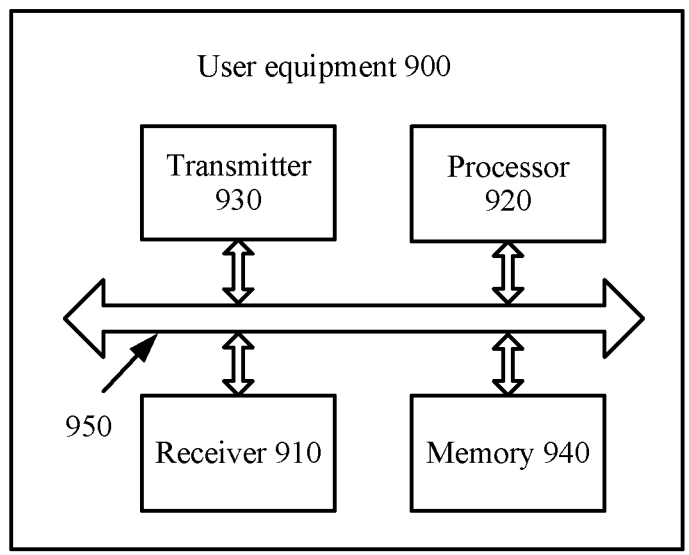
FIG. 10 is a schematic block diagram of user equipment according to another embodiment of the present invention.

FIG. 10 is a schematic block diagram of user equipment 900 according to an embodiment of the present invention. The user equipment 900 includes a receiver 910, a processor 920, a transmitter 930, a memory 940, and a bus system 950. The receiver 910, the processor 920, the transmitter 930, and the memory 930 are connected by using the bus system 950. The memory 940 is configured to store an instruction. The processor 920 is configured to execute the instruction stored in the memory 940, so as to control the receiver 910 to receive a signal and control the transmitter 930 to send the instruction.

The receiver 910 is configured to receive configuration information sent by a network-side device, where the configuration information is used to configure the user equipment UE to perform CSI measurement on different subframe sets on a flexible frequency band or sub-bands of a flexible frequency band, the subframe sets are determined by the network-side device based on uplink-downlink configurations of subframes on the flexible frequency band or the sub-bands of the flexible frequency band in a target cell and at least one neighboring cell of the target cell, and the flexible frequency band is a frequency band on which a transmission direction is configurable.

The processor 920 is configured to perform the CSI measurement based on the configuration information.

Optionally, the subframe sets include a first subframe set and/or a second subframe set, and the processor 920 is specifically configured to: perform the CSI measurement on the first subframe set and/or the second subframe set based on the configuration information.

Optionally, the first subframe set includes subframes in which transmissions in the target cell are in a downlink direction and transmissions in the at least one neighboring cell are not all in a downlink direction, and the second subframe set includes subframes in which transmissions in the target cell and the at least one neighboring cell are all in a downlink direction.

Optionally, the subframe sets are determined by the network-side device based on an interference type of mutual interference between the target cell and the at least one neighboring cell.

Optionally, the network-side device determines an interference level of a subframe of the UE based on the interference type, where the configuration information includes CSI measurement resources and/or subframe sets, and the CSI measurement resources and the subframe sets are corresponding to different interference levels and are determined by the network-side device based on the interference levels of subframes of the UE.

In this embodiment of the present invention, the network-side device determines, based on uplink-downlink configurations of subframes in a neighboring cell, different subframe sets on the flexible frequency band or the sub-bands of the flexible frequency band, and configures, based on the configuration information, the UE to perform CSI measurement on the different subframe sets. In this way, compared with the prior art in which UE reports uniform CSI, the network-side device can obtain CSI measurement results corresponding to the different subframe sets. In other words, the network-side device can obtain CSI measurement results that are more accurate, so that the network-side device can select an appropriate time frequency resource and an appropriate MCS based on a corresponding subframe set when scheduling the UE, thereby improving resource utilization and system data transmission performance.

Optionally, the receiver 910 is specifically configured to: receive configuration information sent by the network-side device, where the configuration information is used to configure the UE to perform the CSI measurement on the second subframe set and/or all of a plurality of subframe subsets, the plurality of subframe subsets are obtained by the network-side device by dividing the first subframe set, and each of the plurality of subframe subsets includes subframes in which a same quantity of transmissions are in a downlink direction or in an uplink direction in the at least one neighboring cell.

Optionally, the configuration information is further used to indicate CSI reference resources configured in the first subframe set and the second subframe set, and/or a subframe configured with the CSI reference resources, and/or a subframe set to which a subframe configured with the CSI reference resources belongs.

Optionally, the configuration information is further used to indicate CSI reference resources configured in the second subframe set and each of the plurality of subframe subsets, and/or a subframe configured with the CSI reference resources, and/or a subframe set or a subframe subset to which a subframe configured with the CSI reference resources belongs.

Optionally, the CSI reference resources include a cell-specific pilot CRS resource and/or a channel state information reference signal CSI-RS resource.

Optionally, the CSI reference resources further include a channel state information interference measurement CSI-IM resource.

Optionally, the CSI-RS resource is a non-zero power channel state information reference signal NZP-CSI-RS and/or a zero power channel state information reference signal CSI-RS.

Optionally, the receiver 910 is specifically configured to: receive the configuration information sent by the network-side device by using broadcast signaling, higher layer signaling, or physical layer L1 signaling.

Optionally, the receiver 910 is specifically configured to: receive the configuration information sent by the network-side device by using the broadcast signaling, the higher layer signaling, or the physical layer L1 signaling on a first carrier of a plurality of carriers.

Optionally, the receiver 910 is specifically configured to: when uplink-downlink configurations of subframes are the same on a plurality of carriers in any one of the at least one neighboring cell and uplink-downlink configurations of subframes are the same on a plurality of carriers in the target cell, receive the configuration information sent by the network-side device by using the broadcast signaling, the higher layer signaling, or the physical layer L1 signaling on the first carrier of the plurality of carriers.

Optionally, the receiver 910 is further configured to: receive CSI reporting trigger information sent by the network-side device; and a first sending unit is configured to send, to the network-side device, CSI corresponding to a subframe set or a subframe subset that includes and is indicated by a subframe in which the CSI reporting trigger information is located.

Optionally, the receiver 910 is specifically configured to: receive first CSI reporting trigger information and second CSI reporting trigger information that are sent by the network-side device; and the transmitter 930 is specifically configured to: when an absolute value of a difference between CSI corresponding to a subframe set or a subframe subset that includes and is indicated by a subframe in which the first CSI reporting trigger information is located and CSI corresponding to a subframe set or a subframe subset that includes and is indicated by a subframe in which the second CSI reporting trigger information is located is greater than a first preset threshold, send, to the network-side device, the CSI corresponding to the subframe set or the subframe subset that includes and is indicated by the subframe in which the first CSI reporting trigger information is located and the CSI corresponding to the subframe set or the subframe subset that includes and is indicated by the subframe in which the second CSI reporting trigger information is located; or when an absolute value of a difference between CSI corresponding to a subframe set or a subframe subset that includes and is indicated by a subframe in which the first CSI reporting trigger information is located and CSI corresponding to a subframe set or a subframe subset that includes and is indicated by a subframe in which the second CSI reporting trigger information is located is less than or equal to a first preset threshold, send, to the network-side device, the CSI corresponding to the subframe set or the subframe subset that includes and is indicated by the subframe in which the first CSI reporting trigger information is located or the CSI corresponding to the subframe set or the subframe subset that includes and is indicated by the subframe in which the second CSI reporting trigger information is located.

Optionally, the transmitter 930 is further configured to: when an absolute value of a difference between CSI corresponding to the second subframe set and CSI corresponding to an $i^{th}$ subframe subset in the plurality of subframe subsets is greater than a second preset threshold, send, to the network-side device, the CSI corresponding to the second subframe set and the CSI corresponding to the $i^{th}$ subframe subset in the plurality of subframe subsets, where the $i^{th}$ subframe subset includes subframes in which transmissions are in a downlink direction in i cells in the at least one neighboring cell, and i is an integer greater than 0; or when an absolute value of a difference between CSI corresponding to the second subframe set and CSI corresponding to an $i^{th}$ subframe subset in the plurality of subframe subsets is less than or equal to a second preset threshold, send, to the network-side device, the CSI corresponding to the second subframe set or the CSI corresponding to the $i^{th}$ subframe subset in the plurality of subframe subsets.

Optionally, the transmitter 930 is further configured to: when an absolute value of a difference between CSI corresponding to the second subframe set and CSI corresponding to a first subframe subset in n subframe subsets is greater than a third preset threshold, send, to the network-side device, the CSI corresponding to the second subframe set and the CSI corresponding to the first subframe subset in the n subframe subsets, where the n subframe subsets are determined by the network-side device based on a sequence of quantities of transmissions that are in a downlink direction in the at least one neighboring cell in one subframe of each subframe subset, the quantities are in a one-to-one correspondence to the n subframe subsets, and the first subframe subset in the n subframe subsets is corresponding to a largest quantity in the quantities; or when an absolute value of a difference between CSI corresponding to the second subframe set and CSI corresponding to a first subframe subset in n subframe subsets is less than or equal to a third preset threshold, send, to the network-side device, the CSI corresponding to the second subframe set or the CSI corresponding to the first subframe subset in the n subframe subsets.

Optionally, the transmitter 930 is specifically configured to: when an absolute value of a difference between CSI corresponding to a $j^{th}$ subframe subset in the n subframe subsets and CSI corresponding to a $(j+1)^{th}$ subframe subset in the n subframe subsets is greater than the third preset threshold, send, to the network-side device, the CSI corresponding to the $j^{th}$ subframe subset in then subframe subsets and the CSI corresponding to the $(j+1)^{th}$ subframe subset in the n subframe subsets, where the quantity corresponding to the $j^{th}$ subframe subset in the n subframe subsets is adjacent to the quantity corresponding to the $(j+1)^{th}$ subframe subset in the n subframe subsets, and the quantity corresponding to the $j^{th}$ subframe subset in the n subframe subsets is greater than the quantity corresponding to the $(j+1)^{th}$ subframe subset in the n subframe subsets; or when an absolute value of a difference between CSI corresponding to a $j^{th}$ subframe subset in the n subframe subsets and CSI corresponding to a $(j+1)^{th}$ subframe subset in the n subframe subsets is less than or equal to the third preset threshold, send, to the network-side device, the CSI corresponding to the $j^{th}$ subframe subset in the n subframe subsets or the CSI corresponding to the $(j+1)^{th}$ subframe subset in the n subframe subsets.

Optionally, the transmitter 930 is specifically configured to: when an absolute value of a difference between CSI corresponding to a first subframe subset in the n subframe subsets and CSI corresponding to a $k^{th}$ subframe subset in the n subframe subsets is greater than the third preset threshold, send, to the network-side device, the CSI corresponding to the first subframe subset in the n subframe subsets and the CSI corresponding to the $k^{th}$ subframe subset in the n subframe subsets, where the $k^{th}$ subframe subset in the n subframe subsets is any subframe subset in the n subframe subsets except the first subframe subset in the n subframe subsets; or when an absolute value of a difference between CSI corresponding to a first subframe subset in the n subframe subsets and CSI corresponding to a $k^{th}$ subframe subset in the n subframe subsets is less than or equal to the third preset threshold, send, to the network-side device, the CSI corresponding to the first subframe subset in the n subframe subsets or the CSI corresponding to the $k^{th}$ subframe subset in the n subframe subsets.

Optionally, the transmitter 930 is further configured to: send a physical uplink shared channel PUSCH to the network-side device, where the PUSCH carries CSI corresponding to the subframe sets.

Optionally, the transmitter 930 is further configured to: send, to the network-side device, a physical uplink control channel PUCCH, where the PUCCH carries at least one of the following: CSI corresponding to the different subframe sets, acknowledgement ACK/non-acknowledgement NACK fed back for the configuration information, and a scheduling request SR.

Optionally, the configuration information further includes CSI reporting periods that are configured for the UE by the network-side device and that are corresponding to the second subframe set and the plurality of subframe subsets, where a CSI reporting period corresponding to the second subframe set is T, a CSI reporting period corresponding to the plurality of second subframe subsets is mT, and m is an integer greater than or equal to 2.

Optionally, the transmitter 930 is further configured to: sending, by the UE, group indexes to the network-side device, where the group indexes are in a one-to-one correspondence to the different subframe sets.

It should be understood that the user equipment 900 may be specifically the user equipment in the foregoing embodiment, and may be configured to perform the steps and/or the processes corresponding to the user equipment in the foregoing method embodiments. Optionally, the memory 940 may include a read-only memory and a random access memory and provide an instruction and data to the processor. A part of the memory may further include a non-volatile random access memory. For example, the memory may further store information about a device type. The processor 920 may be configured to execute the instruction stored in the memory; and when the processor executes the instruction, the processor may perform the steps corresponding to the user equipment in the foregoing method embodiments.

It should be understood that in the embodiment of the present invention, the processor may be a central processing unit (Central Processing Unit, CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor, or the like.

In an implementation process, steps in the foregoing methods may be implemented by using a hardware integrated logic circuit in the processor, or by using instructions in a form of software. The steps of the methods disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and a processor executes an instruction in the memory and completes the steps in the foregoing methods in combination with hardware of the processor. To avoid repetition, details are not described herein.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (Read-Only Memory, "ROM" for short), a random access memory (Random Access Memory, "RAM" for short), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for measuring channel state information (CSI), wherein the method is implemented by a communication system comprising a network-side device that is configured to provide communication services to a user equipment (UE) that is located within a cell of the network-side device, and wherein the method comprises:
   determining, by the network-side device, configuration information, wherein the configuration information configures the UE to perform CSI measurement on different subframe sets on a flexible frequency hand or sub-bands of the flexible frequency band, wherein the subframe sets are determined by the network-side device based on uplink-downlink configurations of subframes on the flexible frequency band or the sub-bands of the flexible frequency band in a target cell and at least one neighboring cell of the target cell, wherein the flexible frequency band comprises a frequency band on which a transmission direction is configurable, wherein the target cell comprises a cell that provides the communication services in a first area, and wherein the neighboring cell comprises a cell that provides the communication services in an area adjacent to the first area covered by the target cell; and
   sending, by the network-side device, the configuration information to the UE to perform the CSI measurement based on the configuration information, wherein the subframe sets comprise a first subframe set or a second subframe set, wherein the first subframe set comprises subframes in which transmission in the target cell are in a downlink direction and transmissions in the at least one neighboring cell are not all in the downlink direction, and wherein the second subframe set comprises subframes in which transmissions in the target cell and the at least one neighboring cell comprise different uplink-downlink configurations.

2. The method of claim 1, further comprising dividing, by the network-side device, the first subframe set into a plurality of subframe subsets, wherein each of the subframe subsets comprises subframes in Which a same quantity of transmissions are in the downlink direction or in an uplink direction in the at least one neighboring cell, and wherein the configuration information configures the in to perform the CSI measurement on the second subframe set or each of the subframe subsets.

3. The method of claim 2, wherein the configuration information further indicates at least one of CSI reference resources configured in the second subframe set and each of the subframe subsets, a subframe configured with the CSI reference resources, or a subframe set or a subframe subset to which the subframe configured with the CSI reference resources belongs, and wherein the CSI reference resources comprises at least one of a CSI reference signal (CSI-RS) resource, a cell-specific pilot cell specific reference signals (CRS) resource, or a CSI interference measurement (CSI-IM) resource.

4. The method of claim 1, wherein the configuration information further indicates at least one of CSI reference resources configured in the first subframe set and the second subframe set, a subframe configured with the CSI reference resources, or a subframe set to which the subframe configured with the CSI reference resources belongs.

5. The method of claim 1, further comprising:
   sending, by the network-side device, CS reporting trigger information to the UE; and
   receiving, by the network-side device, CSI from the UE corresponding to a subframe set or a subframe subset that comprises and that is indicated by a subframe in which the CSI reporting trigger information is located.

6. A method for measuring channel state information (CSI), wherein the method is implemented by a communication system comprising a user equipment (OE) that is configured to receive communication services from a network-side device, wherein the LIE is located within a cell of the network-side device, and wherein the method comprises:
   receiving, by the UE, configuration information from the network-side device, wherein the configuration information configures the UE to perform CSI measurement on different subframe sets on a flexible frequency band or sub-bands of the flexible frequency band, wherein the subframe sets are determined by the network-side device based on uplink-downlink configurations of subframes on the flexible frequency band or the sub-bands of the flexible frequency band in a target cell and at least one neighboring cell of the target cell, wherein the flexible frequency hand comprises a frequency band on which a transmission direction is configurable, wherein the subframe sets comprise a first subframe set or a second subframe set, wherein the target cell comprises a cell that provides the communication services in a first area, and wherein the neighboring cell comprises a cell that provides the communication services in an area adjacent to the first area covered by the target cell; and
   performing, by the UE, the CSI measurement on the first subframe set or the second subframe set based on the configuration information, wherein the first subframe set comprises subframes in which transmissions in the target cell are in a downlink direction and transmissions in the at least one neighboring cell are not all in the downlink direction, and wherein the second subframe set comprises subframes in which transmissions in the target cell and the at least one neighboring cell comprise different uplink-downlink configurations.

7. The method of claim 6, wherein performing the CSI measurement on the first subframe set or the second subframe set based on the configuration information comprises performing, by the UE, the CSI measurement on the second subframe set or all of a plurality of subframe subsets, wherein the subframe subsets are obtained by the network-side device by dividing the first subframe set, and wherein each of the subframe subsets comprises subframes in which a same quantity of transmissions are in the downlink direction or in an uplink direction in the at least one neighboring cell.

8. The method of claim 7, wherein the configuration information further indicates at least one of CSI reference resources configured in the second subframe set and each of the subframe subsets, a subframe configured with the CSI reference resources, or a subframe set or a subframe subset to which the subframe configured with the CSI reference resources belongs.

9. The method of claim 7, further comprising:
   sending, by the UE to the network-side device, CSI corresponding to the second subframe set and CSI corresponding to an $i^{th}$ subframe subset in the subframe subsets when an absolute value of a difference between the CSI corresponding to the second subframe set and the CSI corresponding to the $i^{th}$ subframe subset in the subframe subsets is greater than a second preset threshold, wherein the $i^{th}$ subframe subset comprises subframes in which transmissions are in the downlink direction in i cells in the at least one neighboring cell, and wherein the i is an integer greater than zero; and sending, by the UE to the network-side device, the CSI corresponding to the second subframe set or the CSI corresponding to the $i^{th}$ subframe subset in the subframe subsets when the absolute value of the difference between the CSI corresponding to the second subframe set and the CSI corresponding to the $i^{th}$ subframe subset in the subframe subsets is less than or equal to the second preset threshold.

10. The method of claim 7, further comprising:
sending, by the UE to the network-side device, CSI corresponding to the second subframe set and CSI corresponding to a first subframe subset in n subframe subsets when an absolute value of a difference between the CSI corresponding to the second subframe set and the CSI corresponding to the first subframe subset in the n subframe subsets is greater than a third preset threshold, wherein the n subframe subsets are determined by the network-side device based on a sequence of quantities of transmissions in the downlink direction or in the uplink direction in the at least one neighboring cell in one subframe of each subframe subset, wherein the quantities of the transmissions are in a one-to-one correspondence with correspondence to the n subframe subsets, and wherein the first subframe subset in the n subframe subsets corresponds to a largest quantity in the quantities of the transmissions; and sending, by the UE to the network-side device, the CSI corresponding to the second subframe set or the CSI corresponding to the first subframe subset in the n subframe subsets when the absolute value of the difference between the CSI corresponding to the second subframe set and the CSI corresponding to the first subframe subset in the n subframe subsets is less than or equal to the third preset threshold.

11. The method of claim 10, further comprising:
sending, by the UE to the network-side device, CSI corresponding to a $j^{th}$ subframe subset in the n subframe subsets and CSI corresponding to a $(j+1)^{th}$ subframe subset in the n subframe subsets *hen an absolute value of a difference between the CSI corresponding to the $j^{th}$ subframe subset in the n subframe subsets and the CSI corresponding to the $(j+1)^{th}$ subframe subset in the n subframe subsets is greater than the third preset threshold, wherein a quantity of transmissions corresponding to the $j^{th}$ subframe subset in the n subframe subsets is adjacent to a quantity of transmissions corresponding to the $(j+1)^{th}$ subframe subset in the n subframe subsets, and wherein the quantity of the transmissions corresponding to the $j^{th}$ subframe subset in the n subframe subsets is greater than the quantity of the transmissions corresponding to the $(j+1)^{th}$ subframe subset in the n subframe subsets; and sending, by the UE to the network-side device, the CSI corresponding to the $j^{th}$ subframe subset in the n subframe subsets or the CSI corresponding to the $(j+1)^{th}$ subframe subset in the n subframe subsets when the absolute value of the difference between the CSI corresponding to the $j^{th}$ subframe subset in the n subframe subsets and the CSI corresponding to the $(j+1)^{th}$ subframe subset in the n subframe subsets is less than or equal to the third preset threshold.

12. The method of claim 10, further comprising:
sending, by the LIE to the network-side device, the CSI corresponding to the first subframe subset in the n subframe subsets and CSI corresponding to a $k^{th}$ subframe subset in the n subframe subsets when an absolute value of a difference between the CSI corresponding to the first subframe subset in the n subframe subsets and the CSI corresponding to the $k^{th}$ subframe subset in the n subframe subsets is greater than the third preset threshold, wherein the $k^{th}$ subframe subset in the n subframe subsets comprises any subframe subset in the n subframe subsets except the first subframe subset in the n subframe subsets; and sending, by the UE to the network-side device, the CSI corresponding to the first subframe subset in the n subframe subsets or the CSI corresponding to the $k^{th}$ subframe subset in the n subframe subsets when the absolute value of the difference between the CSI corresponding to the first subframe subset in the n subframe subsets and the CSI corresponding to the $k^{th}$ subframe subset in the n subframe subsets is less than or equal to the third preset threshold.

13. The method of claim 7, wherein the configuration information further comprises CSI reporting periods configured for the UE by the network-side device corresponding to the second subframe set and the subframe subsets, wherein a CSI reporting period corresponding to the second subframe set is T, Wherein a CSI reporting period corresponding to the subframe subsets being mT, and wherein the m is an integer greater than or equal to two.

14. The method of claim 6, wherein the configuration information further indicates at least one of CSI reference resources configured in the first subframe set and the second subframe set, a subframe configured with the CSI reference resources, or a subframe set to which the subframe configured with the CSI reference resources belongs.

15. The method of claim 14, wherein the CSI reference resources comprise at least one of a cell-specific pilot cell specific reference signals (CRS) resource, a CSI reference signal (CSI-RS) resource, or a CSI interference measurement (CSI-IM) resource.

16. The method of claim 6, further comprising:
receiving, by the UE, CSI reporting triggering information from the network-side device; and
sending, by the UE to the network-side device, CSI corresponding to a subframe set or a subframe subset that comprises and that is indicated by a subframe in which the CSI reporting trigger information is located.

17. The method of claim 16, wherein receiving the CSI reporting trigger information from the network-side device comprises receiving, by the UE, first CSI reporting trigger information and second CSI reporting trigger information from the network-side device.

18. A base station, wherein the base station is part of a communication system comprising the base station that is configured to provide communication services to a user equipment (UE) that is located within a cell of the base station, and wherein the base station comprises:
a non-transitory computer readable storage medium comprising instructions; and
a computer processor coupled to the non-transitory computer readable storage medium and configured to execute the instructions to:

determine configuration information, wherein the configuration information configures the UE to perform CSI measurement on different subframe sets on a flexible frequency band or sub-bands of the flexible frequency band, wherein the subframe sets are determined by the base station based on uplink-downlink configurations of subframes on the flexible frequency band or the sub-bands of the flexible frequency band in a target cell and at least one neighboring cell of the target cell, wherein the flexible frequency band comprises a frequency band on which a transmission direction is configurable, wherein the target cell comprises a cell that provides the communication services in a first area, and wherein the neighboring cell comprises a cell that provides the communication services in an area adjacent to the first area covered by the target cell; and send the configuration information to the UE to perform the CSI measurement based on the configuration information, wherein the subframe sets comprise a first subframe set or a second subframe set, wherein the first subframe set comprises subframe in which transmission in the target cell are in a downlink direction and transmissions in the at least one neighboring cell are not all in the downlink direction, and Wherein the second subframe set comprises subframes in which transmissions in the target cell and the at least one neighboring cell comprise different uplink-downlink configurations.

* * * * *

UNITED STATES PATENT AND TRADEMARK OFFICE
CERTIFICATE OF CORRECTION

PATENT NO. : 10,652,902 B2  Page 1 of 1
APPLICATION NO. : 16/090456
DATED : May 12, 2020
INVENTOR(S) : Lili Zhang and Guorong Li It is certified that error appears in the above-identified patent and that said Letters Patent is hereby corrected as shown below:

In the Claims

Claim 1, Column 43, Line 20: "frequency hand of" should read "frequency band of"

Claim 2, Column 43, Line 49: "in Which a same quantity" should read "in which a same quantity"

Claim 2, Column 43, Line 52: "configures the in to perform" should read "configures the UE to perform"

Claim 6, Column 44, Line 14: "user equipment (OE) that is" should read "user equipment (UE) that is"

Claim 6, Column 44, Line 16: "wherein the LIE is located within" should read "wherein the UE is located within"

Claim 6, Column 44, Line 26: "frequency hand comprises" should read "frequency band comprises"

Claim 11, Column 45, Line 48: "subframe subsets *hen an absolute" should read "subframe subsets when an absolute"

Claim 12, Column 46, Line 5: "by the LIE to the network-side" should read "by the UE to the network-side"

Claim 13, Column 46, Line 31: "T, Wherein a CSI" should read "T, wherein a CSI"

Claim 18, Column 47, Line 27: "and Wherein the second" should read "and wherein the second"

Signed and Sealed this
Twenty-third Day of June, 2020

Andrei Iancu
*Director of the United States Patent and Trademark Office*